United States Patent
Hamada et al.

(10) Patent No.: US 8,603,687 B2
(45) Date of Patent: Dec. 10, 2013

(54) FUEL CELL SYSTEM

(75) Inventors: Kenichi Hamada, Hadano (JP);
Nobuyuki Kitamura, Yamanakako-mura (JP); Kouta Manabe, Toyota (JP);
Hiroyuki Imanishi, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 497 days.

(21) Appl. No.: 12/811,064

(22) PCT Filed: Dec. 26, 2008

(86) PCT No.: PCT/JP2008/073772
§ 371 (c)(1),
(2), (4) Date: Aug. 30, 2010

(87) PCT Pub. No.: WO2009/084650
PCT Pub. Date: Jul. 9, 2009

(65) Prior Publication Data
US 2010/0316922 A1 Dec. 16, 2010

(30) Foreign Application Priority Data

Dec. 28, 2007 (JP) .................................. 2007-341267
Dec. 28, 2007 (JP) .................................. 2007-341288

(51) Int. Cl.
*H01M 8/04* (2006.01)
*H02J 7/00* (2006.01)
*B60L 11/18* (2006.01)

(52) U.S. Cl.
USPC ................ 429/428; 307/18; 307/26; 307/28; 307/36; 318/39; 429/432; 701/22

(58) Field of Classification Search
USPC ......... 429/7, 400, 428–432; 318/139, 400.21, 318/400.22; 701/22; 307/9.1, 18, 23, 25, 307/26, 28, 36; 903/903, 907, 908, 930, 903/941
See application file for complete search history.

(56) References Cited

U.S. PATENT DOCUMENTS 5,675,467 A 10/1997 Nishimura et al.
5,780,980 A * 7/1998 Naito ............................ 318/139
(Continued)

FOREIGN PATENT DOCUMENTS

CN 1914780 A 2/2007
DE 102004015563 A1 10/2004
(Continued)

OTHER PUBLICATIONS

Notice of Allowance dated Jun. 18, 2013 in U.S. Appl. No. 12/084,826, filed on May 9, 2008.

*Primary Examiner* — Joseph Drodge
(74) *Attorney, Agent, or Firm* — Kenyon & Kenyon LLP

(57) ABSTRACT

In order to assure drive of a drive motor, a boost operation of a boost device is appropriately performed by judging whether a voltage supplied from a fuel cell suffices a voltage required for driving the drive motor, thereby suppressing a switching loss by the boost device. A fuel cell system is a power source for driving a load. The system includes: a drive motor driven by an electric power; a fuel cell which generates electricity by an electrochemical reaction between an oxidizing gas containing oxygen and a fuel gas containing hydrogen and supplies an electric power to the drive motor; a first boost device which can boosts the voltage outputted from the fuel cell and supplies the boosted voltage to the drive motor; and boost control means which controls voltage boost performed by the first boost device according to the relationship between the fuel cell output voltage and the voltage required by the drive motor.

15 Claims, 22 Drawing Sheets

(56) References Cited

U.S. PATENT DOCUMENTS

| | | | |
|---|---|---|---|
| 6,255,008 B1* | 7/2001 | Iwase | 429/9 |
| 6,369,461 B1* | 4/2002 | Jungreis et al. | 307/46 |
| 6,476,571 B1* | 11/2002 | Sasaki | 318/139 |
| 6,480,767 B2* | 11/2002 | Yamaguchi et al. | 701/22 |
| 6,580,977 B2* | 6/2003 | Ding et al. | 701/22 |
| 7,413,044 B2* | 8/2008 | Uenodai et al. | 180/65.31 |
| 7,419,734 B2* | 9/2008 | Pearson | 429/431 |
| 7,436,148 B2* | 10/2008 | Saeki et al. | 320/104 |
| 7,835,831 B2* | 11/2010 | Chung et al. | 701/22 |
| 2003/0211372 A1 | 11/2003 | Adams et al. | |
| 2003/0224227 A1 | 12/2003 | Voss et al. | |
| 2004/0076860 A1* | 4/2004 | Aso | 429/23 |
| 2004/0197610 A1 | 10/2004 | Drunert | |
| 2005/0069740 A1 | 3/2005 | Ulmer et al. | |
| 2006/0012340 A1 | 1/2006 | Saeki et al. | |
| 2006/0220609 A1 | 10/2006 | Konoto et al. | |
| 2007/0026273 A1 | 2/2007 | Okamoto | |
| 2007/0088483 A1 | 4/2007 | Yoshida | |
| 2007/0199747 A1 | 8/2007 | Aoyagi et al. | |
| 2007/0275276 A1 | 11/2007 | Saeki et al. | |
| 2008/0220298 A1 | 9/2008 | Ishikawa et al. | |
| 2009/0088914 A1 | 4/2009 | Mizutani et al. | |
| 2009/0130509 A1 | 5/2009 | Manabe et al. | |
| 2009/0148735 A1 | 6/2009 | Manabe et al. | |
| 2009/0261761 A1 | 10/2009 | Yoshioka | |
| 2012/0282536 A1 | 11/2012 | Okamoto | |

FOREIGN PATENT DOCUMENTS

| | | |
|---|---|---|
| JP | 04-308432 A | 10/1992 |
| JP | 10-326625 A | 12/1998 |
| JP | 10-336890 A | 12/1998 |
| JP | 11-283648 A | 10/1999 |
| JP | 2000-036308 A | 2/2000 |
| JP | 2002-280034 A | 9/2002 |
| JP | 2003-132960 A | 5/2003 |
| JP | 2003-235162 A | 8/2003 |
| JP | 2004-087425 A | 3/2004 |
| JP | 2004-214004 A | 7/2004 |
| JP | 2005-044708 A | 2/2005 |
| JP | 2005-108773 A | 4/2005 |
| JP | 2005-108815 A | 4/2005 |
| JP | 2005-190938 A | 7/2005 |
| JP | 2005-228524 A | 8/2005 |
| JP | 2005-228525 A | 8/2005 |
| JP | 2005-348530 A | 12/2005 |
| JP | 2006-310271 A | 11/2006 |
| JP | 2007-184243 A | 7/2007 |
| JP | 2007-209161 A | 8/2007 |
| JP | 2007-313982 A | 12/2007 |
| JP | 2007-318938 A | 12/2007 |
| JP | 2007-321461 A | 12/2007 |
| WO | WO 2005/076433 A1 | 8/2005 |
| WO | WO 2007/063783 A1 | 6/2007 |

* cited by examiner

<Mode 1>

<Mode 2>

Graph Of Correlation Between Motor
Necessary Voltage And FC Voltage
(FC Boost Converter NOT Provided)

Graph Of Correlation Between Motor
Necessary Voltage And FC Voltage
(FC Boost Converter Provided)

A diagram showing a correlation between a voltage applied to an inverter and an efficiency characteristic of a load (at Point A)

A diagram showing a correlation between a voltage applied to an inverter and an efficiency characteristic of a load (at Point B)

FUEL CELL SYSTEM

CROSS-REFERENCE TO RELATED APPLICATIONS

This application is the national phase application under 35 U.S.C. §371 of PCT international application No. PCT/JP2008/073772 filed on 26 Dec. 2008, which claims the benefit of priority of the prior Japanese Patent Applications No. 2007-341267, filed on 28 Dec. 2007, and No. 2007-341288, filed on 28 Dec. 2007, the entire contents of which are incorporated herein by reference.

FIELD OF THE INVENTION

The present invention relates to a fuel cell system which supplies a drive motor with electric power from a fuel cell generating the electric power with electrochemical reaction.

BACKGROUND OF THE INVENTION

Over the recent years, a fuel cell has been focused as a power source that is excellent in terms of operation efficiency and environmentality. The fuel cell outputs the electric power in response to a request of a drive motor by controlling a quantity of supply of fuel gas, however, there is a case in which responsibility of the output electric power decreases due to a delay of response of the gas supply quantity, and a secondary battery might be mounted for compensation thereof. This secondary battery accumulates a regenerative energy generated when the drive motor is decelerated and the electric power generated by the fuel cell, and discharges the accumulated energy for the purpose such as compensating the decrease in responsibility of the fuel cell and increasing the output of the whole fuel cell system.

Herein, the fuel cell system, in which a power source is built up by connecting the fuel cell to the secondary battery in parallel, schemes to take a combined use of the fuel cell and the secondary battery in such a way that a DC-DC converter converts an output voltage of the fuel cell and an output voltage of the secondary battery. Then, a technology (refer to, e.g., Patent document 1) is disclosed, which controls drive of the DC-DC converter executing a voltage conversion of an output given from the fuel cell on the basis of a request output from the drive motor while taking a switching loss due to this DC-DC converter into consideration. According to this technology, if the request output of the drive motor is equal to or smaller than a predetermined threshold value, the DC-DC converter is set in an electrically direct-connected state, and the drive motor is supplied with the output of the fuel cell in preference to the output of the secondary battery.

[Patent document 1] Japanese Patent Laid-Open Publication No. 2007-184243
[Patent document 2] Japanese Patent Laid-Open Publication No. 2006-310271
[Patent document 3] Japanese Patent Laid-Open Publication No. 2005-348530
[Patent document 4] Japanese Patent Laid-Open Publication No. 2007-209161
[Patent document 5] Japanese Patent Laid-Open Publication No. 2003-235162
[Patent document 6] Japanese Patent Laid-Open Publication No. 2000-36308

SUMMARY OF THE INVENTION

Problems to be Solved by the Invention

The fuel cell system including the fuel cell serving as a power supply source for supplying the electric power to the drive motor is provided with a boost device that boosts the output voltage of the fuel cell, thereby enabling a variety of merits to be enjoyed. For example, the boost device boosts the voltage, as a result of which the voltage suitable for driving the drive motor can be applied to the drive motor, and it is therefore feasible to improve a drive capacity of the drive motor. While on the other hand, the boost device such as the DC-DC converter normally involves using a switching element, and hence efficiency of the whole fuel cell system might be decreased due to the switching loss thereof.

Such being the case, the switching loss caused by the boost device can be restrained by operating not always but intermittently the boost device such as the DC-DC converter. During a period of stopping the boost device, however, as a matter of course, a post-boosting voltage can not be applied to the drive motor, and a trouble might be, it is considered, caused in driving the drive motor.

Namely, the drive motor is driven by the electric power supplied from the fuel cell to thereby get a load to reach a desired state, which entails supplying an energy required therefor to the drive motor, and hence, as a result, it follows that the output of the fuel cell is determined (note that if there is an energy supply source other than the fuel cell, the output of the fuel cell is determined by taking account of this energy supply source). On the occasion of driving the drive motor, however, even when the required voltage is the same, there is a case in which the voltage required for driving the drive motor fluctuates corresponding to a drive state such as a drive speed. Then, for ensuring the stable drive of the drive motor, a voltage of the electric power supplied from the fuel cell needs to maintain the voltage required for driving the drive motor. In other words, some kind of a correlation exists between a drive state of the drive motor and an electrical characteristic thereof, and it is physically difficult to drive the drive motor in a way that ignores this correlation.

It is an object of the present invention, which was devised in view of the problems given above, to provide a fuel cell system contrived to, in order to establish consistency between ensuring stable drive of a drive motor and improving efficiency of the fuel cell system, restrain a switching loss caused by a boost device in a way that determines whether or not a voltage of electric power supplied from the fuel cell maintains a voltage required for driving the drive motor or determines a proper timing of boosting an output voltage of the fuel cell by the boost device and thus gets the boost device to adequately perform a boost operation.

Means for Solving the Problems

According to the present invention, a solution of the problems described above involves controlling a boost device which boosts an output voltage of a fuel cell on the basis of a comparison-based correlation between the output voltage of the fuel cell and a motor necessary voltage necessary for driving a drive motor. Namely, the present invention puts a focus on importance of the correlation between the output voltage of the fuel cell and the motor necessary voltage necessary for driving the drive motor in terms of ensuring physical drive of the drive motor.

Such being the case, specifically, the present invention is a fuel cell system including: a drive motor serving as a power source for driving a load and driven by electric power; a fuel cell generating electricity with electrochemical reaction of an oxidation gas containing oxygen to a fuel gas containing hydrogen and supplying the electric power to the drive motor; a first boost device boosting a voltage output from the fuel cell and enabling the post-boosting voltage to be supplied to the drive motor; and boost control unit controlling the voltage boost by the first boost device on the basis of a correlation between an output voltage of the fuel cell and a motor necessary voltage for driving the drive motor.

In the fuel cell system, the first boost device is disposed between the fuel cell and the drive motor, whereby it follows that the drive motor is supplied with the voltage boosted by the first boost device. The drive motor is driven by the output voltage of the fuel cell or by a post-boosting voltage given after boosting the output voltage of the fuel cell, a determination of which depends on whether the output voltage of the fuel cell maintains the voltage required for driving the drive motor or not.

Herein, the output voltage of the fuel cell connotes a voltage of electric power generated by the fuel cell serving as a power supply source and supplied for driving the drive motor, and the motor necessary voltage connotes a voltage of the electric power supplied to the drive motor for the motor's exhibiting a predetermined level of drive force in order for a load to reach a desired state. Accordingly, it is of importance to determine, based on the correlation between the output voltage of the fuel cell and the motor necessary voltage necessary for driving the drive motor, which scheme is taken, i.e., the drive motor is driven by the output voltage of the fuel cell, or the drive motor is driven by the post-boosting voltage given after boosting the output voltage of the fuel cell. Namely, if the output voltage of the fuel cell is higher than the necessary voltage of the drive motor, the operation of the drive motor can be ensured without the first boost device boosting the voltage.

Whereas if the output voltage of the fuel cell is lower than the necessary voltage of the drive motor and even when the fuel cell supplies the electric power sufficient for driving the drive motor, there is a case of causing difficulty of ensuring the stable operation of the drive motor if it remains unchanged, and the requirement is that the first boost device boosts the voltage. This being the case, in the fuel cell system according to the present invention, the boost control unit controls the boost operation of the first boost device on the basis of the correlation between the output voltage of the fuel cell and the motor necessary voltage of the drive motor, whereby the switching loss due to the voltage boost of the first boost device can be restrained while ensuring the stable drive of the drive motor.

Further, in the fuel cell system described above, the boost control unit may calculate output electric power of the fuel cell when driving the drive motor on the basis of the motor necessary electric power necessary for driving the drive motor and electric power that is lost when the first boost device boosts the output voltage of the fuel cell, and may calculate output voltage of the fuel cell from the calculated output electric power of the fuel cell.

The output voltage of the fuel cell, which becomes a motor necessary voltage comparative target, can be calculated from the output electric power of the fuel cell. For example, the output voltage of the fuel cell can be calculated from the output electric power of the fuel cell on the basis of a power characteristic of the current and a power characteristic of the voltage of the fuel cell. Herein, the output electric power of the fuel cell is generated in such a way that the fuel cell serving as the power supply source generates the electricity, and is partially supplied for driving the drive motor. When the first boost device performs the boost operation, the switching loss might occur due to the first boost device. If the switching loss occurs due to the first boost device, the output electric power of the fuel cell is calculated by taking account of the switching loss due to the first boost device. The output electric power of the fuel cell is calculated by taking account of the switching loss due to the first boost device, thereby enabling the motor necessary voltage to be compared with the output voltage of the fuel cell more properly.

Moreover, the fuel cell system described above may further include a secondary battery capable of charging and discharging of the electric power and supplying the electric power to the drive motor with the discharge, wherein the boost control unit may calculate output electric power of the fuel cell when driving the drive motor on the basis of the motor necessary electric power necessary for driving the drive motor and the electric power in the charge and the discharge of the secondary battery, and may calculate output voltage of the fuel cell from the calculated output electric power of the fuel cell.

Herein, the electric power in the charge and the discharge of the secondary battery connotes the electric power charged into the secondary battery and the electric power discharged from the secondary battery. If a residual electricity quantity of the secondary battery is equal to or larger than a threshold value for switching over the charge and the discharge of the secondary battery, i.e., if the secondary battery is in a discharging state, the electric power discharged from the secondary battery can be supplied to the drive motor, and the output electric power of the fuel cell tends to decrease. Further, if the residual electricity quantity of the secondary battery is less than the threshold value for switching over the charge and the discharge of the secondary battery, i.e., if the secondary battery is in a charging state, the output electric power of the fuel cell can be supplied to the secondary battery and tends to increase. Namely, depending on whether the secondary battery is in the charging state or the discharging state, the output electric power of the fuel cell fluctuates, as a result of which the output voltage of the fuel cell also fluctuates. Then, if the secondary battery is in the charging state, the output electric power of the fuel cell is calculated in a way that takes account of the electric power charged to the secondary battery. And if the secondary battery is in the discharging state, the output electric power of the fuel cell is calculated in a way that takes account of the electric power discharged from the secondary battery. The output voltage of the fuel cell is calculated by taking account of the charging/discharging states of the secondary battery, whereby the motor necessary voltage can be compared with the output voltage of the fuel cell more properly.

Furthermore, in the fuel cell system described above, the boost control unit may calculate output electric power of the fuel cell when driving the drive motor on the basis of the motor necessary electric power necessary for driving the drive motor, the electric power in the charge and the discharge of the secondary battery and the electric power that is lost when the first boost device boosts the output voltage of the fuel cell, and may calculate output voltage of the fuel cell from the calculated output electric power of the fuel cell. With this contrivance, the output voltage of the fuel cell is calculated by taking into consideration the charging/discharging states of the secondary battery and the switching loss due to the first boost device, thereby enabling the motor necessary voltage to be compared with the output voltage of the fuel cell more properly.

Moreover, the fuel cell system described above may further include a second boost device boosting a voltage output from the secondary battery and enabling the post-boosting voltage to be supplied to the drive motor, wherein the boost control unit may calculate output electric power of the fuel cell when driving the drive motor on the basis of the motor necessary electric power necessary for driving the drive motor, the electric power in the charge and the discharge of the secondary battery and the electric power that is lost when the second boost device boosts the output voltage of the secondary battery, and may calculate output voltage of the fuel cell from the calculated output electric power of the fuel cell. The second boost device performs the boost operation, in which case the switching loss due to the second boost device might occur. If the switching loss due to the second boost device occurs, the output electric power of the fuel cell is calculated by taking account of the switching loss due to the second boost device. The output voltage of the fuel cell is calculated by taking into consideration the charging/discharging states of the secondary battery and the switching loss due to the second boost device, thereby enabling the motor necessary voltage and the output voltage of the fuel cell to be compared with each other more adequately.

Further, in the fuel cell system described above, the boost control unit may calculate output electric power of the fuel cell when driving the drive motor on the basis of the motor necessary electric power necessary for driving the drive motor, the electric power in the charge and the discharge of the secondary battery, the electric power that is lost when the first boost device boosts the output voltage of the fuel cell and the electric power that is lost when the second boost device boosts the output voltage of the secondary battery, and may calculate output voltage of the fuel cell from the calculated output electric power of the fuel cell. With this contrivance, the output voltage of the fuel cell is calculated by taking into consideration the charging/discharging states of the secondary battery, the switching loss due to the first boost device and the switching loss due to the second boost device, thereby enabling the motor necessary voltage to be compared with the output voltage of the fuel cell more properly.

Still further, the fuel cell system described above may further include a buck-boost device stepping up and down a voltage output from the secondary battery and enabling the post-stepping-up-and-down voltage to be supplied to the drive motor, wherein the boost control unit may calculate output electric power of the fuel cell when driving the drive motor on the basis of the motor necessary electric power necessary for driving the drive motor, the electric power in the charge and the discharge of the secondary battery and the electric power that is lost when the buck-boost device steps up and down the output voltage of the secondary battery, and may calculate output voltage of the fuel cell from the calculated output electric power of the fuel cell.

The buck-boost device conducts the step-up and step-down operations, in which case the switching loss due to the buck-boost device might occur. If the switching loss due to the buck-boost device occurs, the output electric power of the fuel cell is calculated by taking account of the switching loss due to the buck-boost device. The output voltage of the fuel cell is calculated by taking into consideration the charging/discharging states of the secondary battery and the switching loss due to the buck-boost device, whereby the motor necessary voltage can be compared with the output voltage of the fuel cell more properly.

Moreover, in the fuel cell system described above, the boost control unit may calculate output electric power of the fuel cell when driving the drive motor on the basis of the motor necessary electric power necessary for driving the drive motor, the electric power in the charge and the discharge of the secondary battery, the electric power that is lost when the first boost device boosts the output voltage of the fuel cell and the electric power that is lost when the buck-boost device steps up and down the output voltage of the secondary battery, and may calculate output voltage of the fuel cell from the calculated output electric power of the fuel cell. With this contrivance, the output voltage of the fuel cell is calculated by taking into consideration the charging/discharging states of the secondary battery, the switching loss due to the first boost device and the switching loss due to the buck-boost device, thereby enabling the motor necessary voltage to be compared with the output voltage of the fuel cell more properly.

Furthermore, in the fuel cell system described above, the boost control unit may further control the boost of the voltage by the first boost device on the basis of a correlation between a voltage applied to the drive motor and drive efficiency of the drive motor. Drive efficiency of the drive motor fluctuates depending on the voltage applied to the drive motor as the case may be. For example, the drive efficiency of the drive motor might be different depending on when the voltage applied to the drive motor is high and when low, and a correlation exists between the voltage of applied to the drive motor and the drive efficiency of the drive motor. The voltage boost by the first boost device is controlled based on the correlation between the voltage of applied to the drive motor and the drive efficiency of the drive motor, whereby the voltage exhibiting the preferable drive efficiency of the drive motor can be applied to the drive motor.

Furthermore, in the fuel cell system described above, the boost control unit may further control the boost of the voltage by the first boost device and the boost of the voltage by the second boost device on the basis of the correlation between the voltage applied to the drive motor and the drive efficiency of the drive motor. With this operation, the voltage exhibiting the preferable drive efficiency of the drive motor can be applied to the drive motor. Moreover, in the fuel cell system described above, the boost control means may further control the boost of the voltage by the first boost device and the step-up and the step-down of the voltage by the buck-boost device on the basis of the correlation between the voltage applied to the drive motor and the drive efficiency of the drive motor. With this operation, the voltage exhibiting the preferable drive efficiency of the drive motor can be applied to the drive motor.

Further, in the fuel cell system described above, the boost control unit, when the output voltage of the fuel cell is higher than the motor necessary voltage of the drive motor, may inhibit the output voltage of the fuel cell from being boosted by the first boost device and may thus supply the output voltage of the fuel cell directly to the drive motor. As discussed above, when the output voltage of the fuel cell is higher than the motor necessary voltage of the drive motor, the operation of the drive motor can be ensured without the first boost device boosting the voltage, so that the boost control unit inhibits the boost operation of the first boost device to completely restrain the switching loss due to the first boost device, thus enabling the efficiency of the whole fuel cell system to be improved.

Further, the present invention can be grasped from another aspect. In this case, for solving the problems given above, a predetermined correlation is set between the output voltage of the fuel cell and the motor necessary voltage necessary for driving the drive motor, and the boost device, which boosts the output voltage of the fuel cell, is controlled based on this correlation. Namely, the present invention puts a focus on a point that the correlation between the output voltage of the fuel cell and the motor necessary voltage of the drive motor is highly important in terms of ensuring the physical drive of the drive motor.

Then, To be specific, the present invention is a fuel cell system including: a drive motor serving as a power source for driving a load and driven by electric power; a fuel cell generating electricity with electrochemical reaction of an oxidation gas containing oxygen to a fuel gas containing hydrogen and supplying the electric power to the drive motor, an output voltage of the fuel cell being set so as to exceed a motor necessary voltage necessary for driving the drive motor in a predetermined drive range defined as a partial area of a drive range of the drive motor; a first boost device boosting a voltage output from the fuel cell and enabling the post-boosting voltage to be supplied to the drive motor; and boost control unit controlling the voltage boost by the first boost device on the basis of a correlation between an output voltage of the fuel cell and a motor necessary voltage necessary for driving the drive motor when driving the drive motor. Then, it is preferable that the first boost device can control a terminal voltage of the fuel cell through the boost operation thereof.

In the fuel cell system described above, the first boost device is disposed between the fuel cell and the drive motor, whereby it follows that the drive motor is supplied with the voltage boosted by the first boost device. Herein, between the output voltage of the fuel cell and the motor necessary voltage necessary for driving the drive motor, as mentioned above, the output voltage of the fuel cell is set so as to exceed the motor necessary voltage in the predetermined drive range of the drive motor. Herein, the predetermined drive range connotes a partial area of a range of all of the drive states that can be taken by the drive motor to drive the load, and this predetermined drive range can be set arbitrarily and properly. Moreover, the output voltage of the fuel cell is a voltage of the electric power generated by the fuel cell as the power supply source and supplied for driving the drive motor, and the motor necessary voltage connotes a voltage of the electric power supplied to the drive motor for the motor's exhibiting a predetermined level of drive force in order for a load to reach a desired state.

Accordingly, if the operation state of the drive motor belongs to the predetermined drive range, a correlation, in which the output voltage of the fuel cell exceeds the motor necessary voltage of the drive motor, exists between the fuel cell and the drive motor, and, whereas if the operation state of the drive motor does not belong to the predetermined drive range, conversely it follows that a correlation, in which the output voltage of the fuel cell is equal to or smaller than the motor necessary voltage of the drive motor, exists between the fuel cell and the drive motor. Herein, this correlation is extremely important in terms of ensuring the physical operation of the drive motor. Namely, in this correlation, if the output voltage of the fuel cell exceeds the necessary voltage of the drive motor, it is feasible to ensure the operation of the drive motor without the first boost device boosting the voltage. Whereas if the output voltage of the fuel cell does not exceed the necessary voltage of the drive motor and even when the fuel cell supplies the electric power sufficient for driving the drive motor, there is a case of causing difficulty of ensuring the stable operation of the drive motor if it remains unchanged, and the requirement is that the first boost device boosts the voltage.

Such being the case, in the fuel cell system according to the present invention, the boost control unit controls the boost operation of the first boost device on the basis of the correlation between the output voltage of the fuel cell and the motor necessary voltage of the drive motor, whereby the switching loss due to the boost of the voltage by the first boost device can be restrained to the greatest possible degree while ensuring the stable drive of the drive motor. Moreover, such a necessity is eliminated that the boost control unit boosts the output voltage of the fuel cell over the entire drive range of the drive motor, and hence a voltage difference between the motor necessary voltage of the drive motor and the voltage to be supplied can be restrained small, whereby futile consumption of the energy is hard to occur when driving the drive motor.

Herein, in the fuel cell system described above, the boost control unit may, when a drive state of the drive motor belongs to the predetermined drive range or when an input-side voltage of the first boost device in the fuel cell system is higher than the motor necessary voltage, restrict the output voltage of the fuel cell from being boosted by the first boost device and thus supplies the output voltage of the fuel cell directly to the drive motor.

As discussed above, when the drive state of the drive motor belongs to the predetermined drive range, the output voltage of the fuel cell can exceed the motor necessary voltage. In other words, in this case, the input-side voltage of the first boost device can be higher than the motor necessary voltage. In such a case, as described above, the operation of the drive motor can be ensured even when the first boost device does not boost the voltage, so that the boost control unit restricts the boost operation of the first boost device to completely restrain the switching loss due to the first boost device, thus enabling the efficiency of the whole fuel cell system to be improved.

Moreover, in the fuel cell system described above, the predetermined drive range may be a drive range where the drive motor is requested to be driven if a user's request for driving the load is satisfied at a rate equal to or larger than a predetermined rate. Namely, the predetermined drive range is, though arbitrarily set by a user of the fuel cell system, set preferably by taking into consideration a user's request for driving the load. Normally, in the case of driving the load, the user has less of a chance of equally utilizing the drive range, and there is a tendency that a frequently-used range exists. For instance, the drive range in which to request low and intermediate outputs has a higher usage frequency than the drive range in which to request a high output has. Such being the case, the predetermined drive range is set in the drive range having the high usage frequency, i.e., the drive range in which a frequency of the request for driving the load is equal to or larger than a predetermined rate, thereby enabling an increase in stop frequency of the boost operation of the first boost device in the fuel cell system and thus contributing to improve the efficiency of the fuel cell system.

Herein, the fuel cell system described above may further include a secondary battery capable of accumulating and discharging the electric power and supplying the electric power to the drive motor with the discharge, a maximum output voltage of the secondary battery being set so as to be lower than a maximum output voltage of the fuel cell in a second predetermined drive range defined as a partial area of the predetermined drive range; and a second boost device boosting a voltage output from the secondary battery and enabling the post-boosting voltage to be supplied to the drive motor. Then, it is preferable that the second boost device can control the voltage that should be applied to the drive motor from the fuel cell system through the boost operation thereof, e.g., the voltage applied to an inverter if the drive motor is equipped with the inverter.

In the thus-configured fuel cell system, similarly to the case of the fuel cell, the electric power accumulated in the secondary battery can be, after the second boost device has boosted the voltage thereof, provided to the drive motor. In order for this second boost device serving as the boost-type device that does not step down the voltage to boost the voltage, however, the input-side voltage of the second boost device, i.e., the output voltage of the secondary battery, must be lower than the output-side voltage of the second boost device, i.e., the voltage on the side of the drive motor. Then, this drive motor is supplied with the voltage from the fuel cell or the first boost device. Based on what has been discussed so far, if the voltage output from the fuel cell and supplied to the drive motor irrespective of whether or not the first boost device boosts the voltage becomes equal to or smaller than the output voltage of the secondary battery, it is difficult to supply the electric power from the secondary battery.

Then, for enabling the electric power to be supplied from the secondary battery and enabling the boost operation of the first boost device to be stopped for improving the efficiency of the fuel cell system, in the second predetermined drive range, the maximum output voltage of the secondary battery is set lower than the maximum output voltage of the fuel cell. With this contrivance, an opportunity of enabling the second boost device to perform the boost operation is invariably ensured, and, in the second predetermined drive range as the partial area of the predetermined drive range, as discussed above, the efficiency of the fuel cell system can be ameliorated by stopping the boost operation of the first boost device. Alternatively, an opportunity of switching over the actuation and the stop of the boost operation of the second boost device can be acquired, thereby improving the efficiency of the fuel cell system.

Then, when a drive state of the drive motor belongs to the second predetermined drive range or when an input-side voltage of the first boost device in the fuel cell system is higher than the motor necessary voltage and is also higher than the maximum output voltage of the secondary battery, the boost control unit may restrict the output voltage of the fuel cell from being boosted by the first boost device and may thus supply the output voltage of the fuel cell directly to the drive motor.

As described above, when the drive state of the drive motor belongs to the second predetermined drive range, the output voltage of the fuel cell exceeds the motor necessary voltage, and the boost operation of the second boost device is ensured. In other words, in this case, the input-side voltage of the first boost device can be higher than the motor necessary voltage and can be also higher than the output voltage of the secondary battery. In such a case, as mentioned above, the operation of the drive motor can be ensured without the first boost device boosting the voltage, and the boost operation of the second boost device can be also assured, so that the boost control unit restricts the boost operation of the first boost device to completely restrain the switching loss due to the first boost device, thus enabling the efficiency of the whole fuel cell system to be improved.

Herein, when the first boost device is operated in order to ensure the boost operation of the second boost device, the efficiency of the fuel cell system is affected by the switching loss due to the boost operation of the first boost device. This being the case, it is preferable that the boost control unit executes the following process for restraining, if possible, more of the switching loss due to the first boost device without hindering the stable drive of the drive motor to the greatest possible degree.

Namely, the boost control unit may, when the drive state of the drive motor belongs to the predetermined drive range excluding the second predetermined drive range, restrict the output voltage of the fuel cell from being boosted by the first boost device and may thus temporarily increase a capacity of the power supply to the drive motor from the secondary battery more than when performing the normal power supply. In such a case, the boost control device restricts the boost operation of the first boost device, thereby scheming to improve the efficiency of the fuel cell system.

On the other hand, though the drive of the second boost device is hard to be sufficiently ensured depending on the output voltage of the secondary battery because of the first boost device not boosting the voltage, the capacity of the power supply to the drive motor from the secondary battery is temporarily increased in order to make a compensation thereof more than when performing the normal power supply. For example, a terminal voltage of the fuel cell is controlled down to a minimum voltage required by the drive motor, in which state the secondary battery can be made to discharge an output equal to or larger than the output of the fuel cell, which is generated by this minimum voltage.

Moreover, the case of similarly restricting the boost operation of the first boost device and temporarily increasing the power supply capacity of the secondary battery is exemplified such as when the input-side voltage of the first boost device in the fuel cell system is equal to or lower than the maximum output voltage of the secondary battery and when an output-side voltage of the first boost device in the fuel cell system is equal to or lower than the maximum output voltage of the secondary battery. Namely, if there is a case of having a possibility that the voltage boost of the second boost converter can not be ensured, the capacity of the power supply to the drive motor from the secondary battery is temporarily increased more than when performing the normal power supply while scheming to improve the efficiency of the fuel cell system by restricting the boost operation of the first boost device, whereby the drive of the second boost device is ensured to the greatest possible degree.

Herein, in the fuel cell system described so far, the second predetermined drive range may be coincident with the predetermined drive range. Namely, in the predetermined drive range, it follows that the maximum output voltage of the secondary battery is set lower than the maximum output voltage of the fuel cell. Thus, the correlation exists among the output voltage of the fuel cell, the output voltage of the secondary battery and the motor necessary voltage necessary of the drive motor, whereby it is feasible to establish the consistency between improving the efficiency of the fuel cell system due to stopping the boost operation of the first boost device and supplying the voltage boosted by the second boost device.

Further, the second boost device described so far may be a device capable of changing the voltage in a so-called buck-boost (step-down and step-up) mode such as further stepping down the voltage output from the secondary battery and supplying the post-stepping-down voltage to the drive motor. In this case, if the drive state of the drive motor belongs to the predetermined drive range irrespective of whether this drive state belongs to the second predetermined drive range or not, the boost control unit can restrict the first boost device from boosting the output voltage of the fuel cell and can supply the output voltage of the fuel cell directly to the drive motor. Namely, regardless of the correlation between the output voltage of the secondary battery and the output voltage of the fuel cell, it is feasible to restrict the boost operation of the first boast device and further scheme to improve the efficiency of the fuel cell system. In other words, the second boost device being of the buck-boost type, irrespective of the correlation with the output voltage of the fuel cell, the output from the secondary battery is stepped up or stepped down and thus can be supplied to the drive motor.

Effects of the Invention

The fuel cell system according to the present invention determines whether or not the voltage of the electric power supplied from the fuel cell maintains the voltage necessary for driving the drive motor in order to establish the consistency between ensuring the stable drive of the drive motor and ameliorating the efficiency of the fuel cell system, or properly determines the timing when the boost device boosts the output voltage of the fuel cell, thus gets the boost device to adequately perform the boost operation, and can scheme to restrain the switching loss due to the boost device.

DESCRIPTION OF THE REFERENCE NUMERALS AND SYMBOLS

Figure 1:
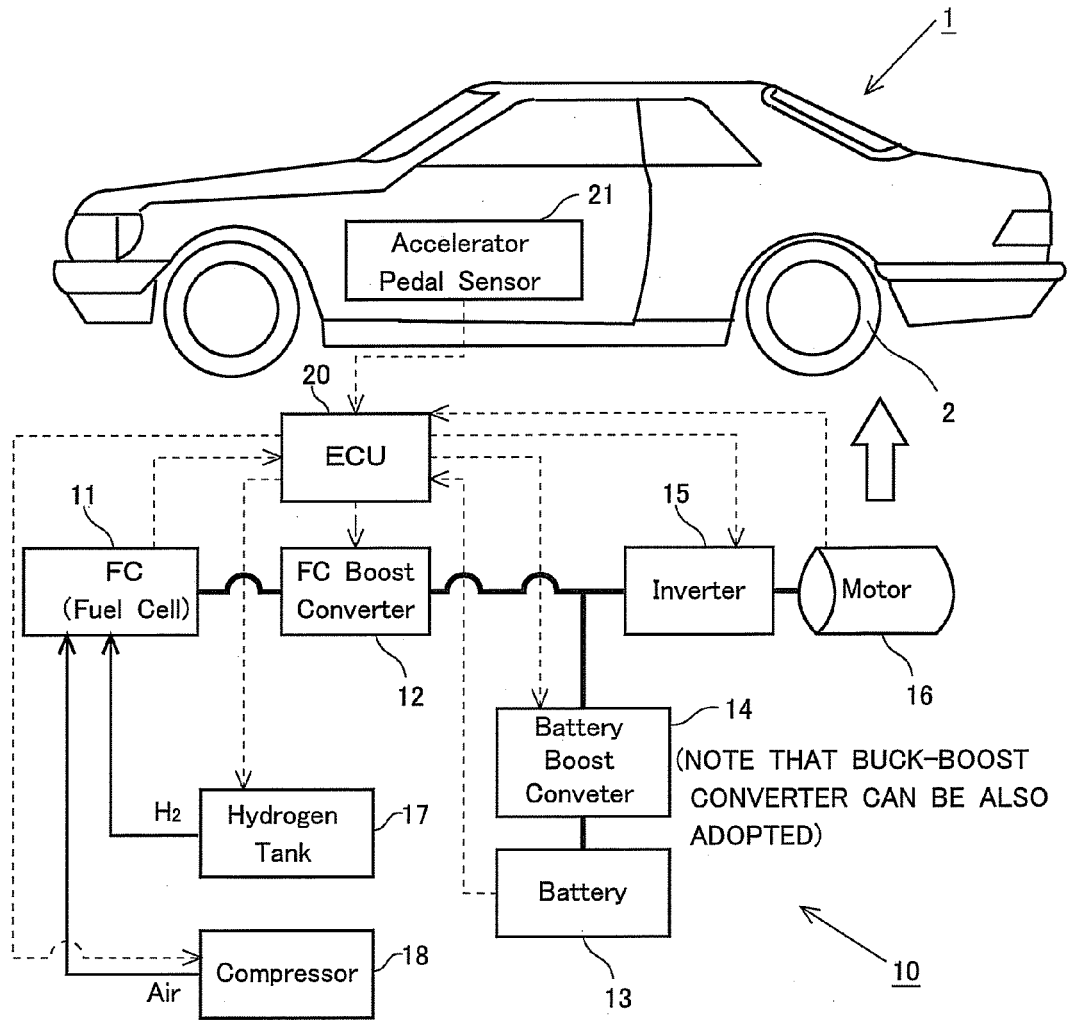
FIG. 1 A diagram illustrating an outline of a configuration of a fuel cell system according to a working example of the present invention.

1 . . . vehicle
10 . . . fuel cell system
11 . . . fuel cell (FC)
12 . . . FC boost converter
12a . . . main boost circuit
12b . . . auxiliary circuit
13 . . . battery
14 . . . battery boost converter
15 . . . inverter
16 . . . motor
20 . . . ECU
21 . . . accelerator pedal sensor
S1, S2, S3 . . . switching element
C1, C3 . . . smoothing capacitor
C2 . . . snubber capacitor
L1, L2, L3 . . . coil
D1, D2, D3, D4, D5 . . . diode

DETAILED DESCRIPTION

An in-depth description of an embodiment of a fuel cell system 10 according to the present invention will be made based on drawings. The fuel cell system 10 according to the embodiment supplies electric power to a drive motor 16 classified as a driving apparatus (transmission system) of a vehicle 1 as a movable body and can be applied to movable bodies such as ships and robots other than the vehicle 1 and to bodies that are not movable but need to be supplied with the electric power.

First Working Example

FIG. 1 schematically illustrates an outline of a configuration of the fuel cell system 10 according to the present invention and the vehicle 1 of the movable body of which a drive source is the electric power supplied from the fuel cell system 10. Drive wheels 2 are driven by the drive motor (which will hereinafter simply be referred to as the [motor]) 16, whereby the vehicle 1 drives itself and thus gets movable. This motor 16 is a so-called three-phase AC (Alternating Current) motor and supplied with AC power from an inverter 15. Further, this inverter 15 is supplied with DC (Direct Current) power from a fuel cell (which is also abbreviated to [FC]) 11 defined as a main power source of the fuel cell system 10 and from a battery 13 defined as a secondary battery, and the supplied DC power is converted into the alternating current (AC) by the inverter 15.

Herein, the fuel cell 11 generates the electricity with electrochemical reaction between a hydrogen gas reserved in a hydrogen tank 17 and oxygen contained in the air that is pressure-fed by a compressor 18, and an FC boost converter 12 classified as a boost type DC-DC converter is electrically connected to between the fuel cell 11 and the inverter 15. With this electric connection, an output voltage from the fuel cell 11 is boosted up to an arbitrary voltage in a controllable range by the FC boost converter 12 and then applied to the inverter 15. Further, the boost operation of the FC boost converter 12 also enables a terminal voltage of the fuel cell 11 to be controlled. Note that an in-depth description of the FC boost converter 12 will be made later on. Further, the battery 13 is a chargeable/dischargeable storage battery device, and a boost type battery boost converter 14 is electrically connected to between the battery 13 and the inverter 15 so as to be parallel to the FC boost converter 12 with respect to the inverter 15. With this arrangement, an output voltage from the battery 13 is boosted up to an arbitrary voltage in the controllable range by the battery boost converter 14 and then applied to the inverter 15. Moreover, the boost operation of this battery boost converter 14 enables the terminal voltage of the inverter 15 to be controlled. It should be noted that as illustrated in FIG. 1, in the fuel cell system 10, a buck-boost converter capable of performing the boost operation and a buck operation (depressurization) can be adopted in place of the boost type battery boost converter 14. The discussion on the following working example will proceed mainly on the assumption that the battery boost converter 14 is the boost type converter, however, this scheme does not intend to restrict the adoption of the buck-boost converter, and a proper adjustment will be made on the occasion of adopting the buck-boost converter. Then, the further should-be-specially-described facts owing to the adoption of the buck-boost converter will be adequately disclosed.

Moreover, the vehicle 1 includes an electronic control unit (which will hereinafter be abbreviated to [ECU]) 20 electrically connected to the respective control target components, thereby controlling the power generation of the fuel cell 11 and the actuation of the motor 16. For example, the vehicle 1 is provided with an accelerator pedal which receives an acceleration request from a user, an accelerator pedal sensor 21 detects an accelerator opening degree, and a detection signal thereof is electrically transmitted to the ECU 20. Further, the ECU 20 is electrically connected to an encoder which detects the number of revolutions of the motor 16, whereby the number of revolutions of the motor 16 is detected by the ECU 20. The ECU 20 can perform various types of control based on these detected values etc.

In the thus-configured fuel cell system 10, the accelerator pedal sensor 21 detects the opening degree of the accelerator pedal trodden by the user of the vehicle 1, and the ECU 20 properly controls, based on the accelerator opening degree and the number of revolutions of the motor 16, a quantity of power generation of the fuel cell 11 and a charging/discharging quantity from the battery 13. Herein, the motor 16 is a PM (Permanent Magnet) motor based on high-voltage low-current specifications in order to improve fuel consumption of the vehicle 1 as the movable body. Accordingly, the motor 16 is capable of exhibiting a high torque at a low current, thereby enabling a reduction of the heat evolved by winding wires and other wires arranged in an interior of the motor and also a decrease in rated output of the inverter 15. To be specific, in the motor 16, its counter electromotive force (voltage) is set comparatively high for enabling a comparatively large torque output to be attained at the low current, while the voltage supplied from the fuel cell system 10 is set high so as to enable the drive to be done with the large number of revolutions in a way that resists the high counter electromotive force. At this time, the FC boost converter 12 is provided between the fuel cell 11 and the inverter 15, and the battery boost converter 14 is also provided between the battery 13 and the inverter 15, thus scheming to increase the voltage supplied to the inverter 15. Though iterative in explanation, the buck-boost converter can be adopted as the substitute for this battery boost converter 14.

Thus, the fuel cell system 10 is configured to include the FC boost converter 12, whereby the motor 16 can be actuated through the boost operation of the FC boost converter 12 even when the output voltage (the inter-terminal voltage) of the fuel cell 11 itself to thereby enable the fuel cell 11 to be downsized by decreasing the number of cell stacks of the fuel cell 11. As a result, a weight of the vehicle 1 can be reduced, and the improvement of the fuel consumption can be further expedited.

Herein, in the fuel cell system 10, the fuel cell 11 capable of generating the electric power is the main power source for the motor 16. Accordingly, it is considered for improving efficiency of the fuel cell system 10 that a decrease in power loss in the FC boost converter 12 interposed between the fuel cell 11 and the inverter 15 largely contributes to ameliorate the efficiency of the whole system. As a matter of course, the same thing can be applied in principle to the battery boost converter 14 existing between the battery 13 and the inverter 15.

Figure 2:
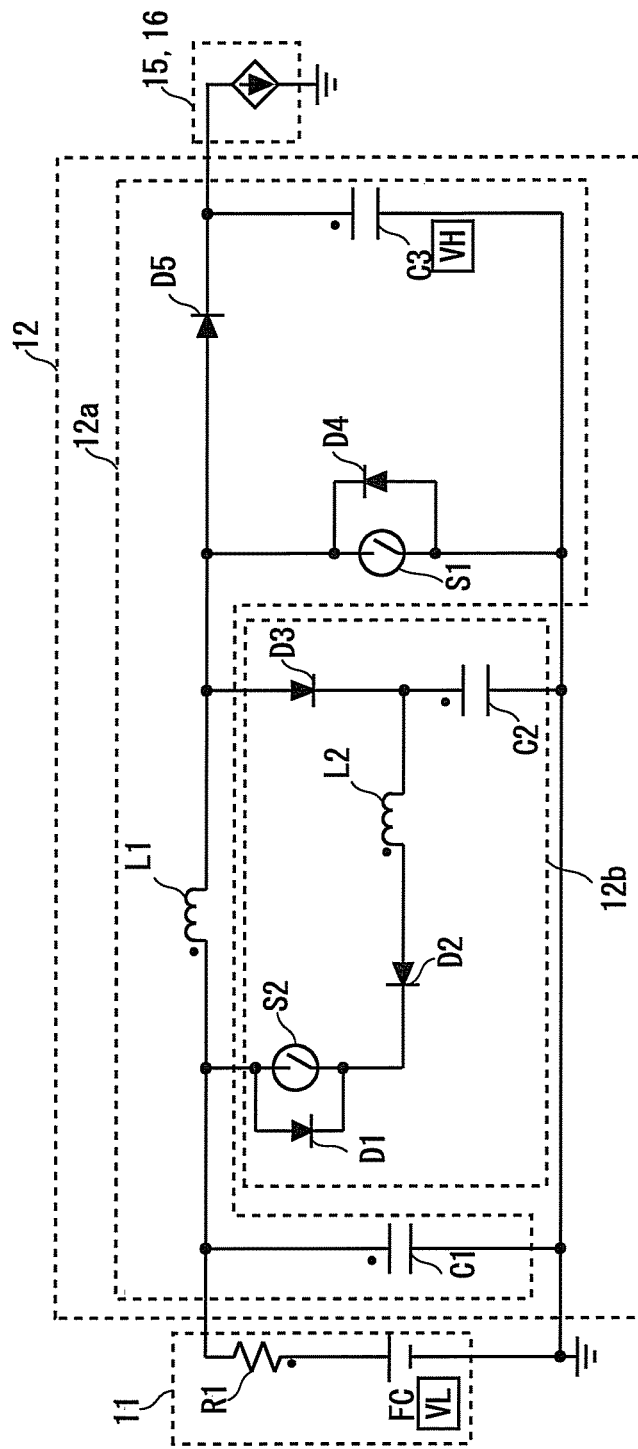
FIG. 2 A first diagram illustrating a configuration of an electric circuit of the fuel cell system shown in FIG. 1, especially a configuration of an electric circuit of an FC boost converter.

Herein, characteristics of electric circuits of the FC boost converter 12 will hereinafter be described based on FIG. 2. FIG. 2 is a diagram showing an electric configuration of the fuel cell system 10, however, the illustrations of the battery 13 and the battery boost converter 14 are omitted for simplifying the description.

The FC boost converter 12 is constructed of a main boost circuit 12a for conducting the boost operation as the DC-DC converter and of an auxiliary circuit 12b for performing a soft switching operation which will be explained later on. The main boost circuit 12a boosts the output voltage of the fuel cell 11 by releasing an energy accumulated in a coil L1 towards the side of the motor 16 (the side of the inverter 15) via a diode D5 with a switching operation of a switching circuit constructed of a switching element S1 and a diode D4. Specifically, one end of the coil L1 is connected to a terminal, on a high potential side, of the fuel cell 11. Then, a pole of one end of the switching element S1 is connected to other end of the coil L1, while a pole of the other end of the switching element S1 is connected to the terminal, on a low potential side, of the fuel cell 11. Moreover, a cathode terminal of the diode D5 is connected to the other end of the coil L1, and further a capacitor C3 is connected to between an anode terminal of the diode D5 and the other end of the switching element S1. Note that in this main boost circuit 12a, the capacitor C3 functions as a smoothing capacitor of the boost voltage. It is also noted that the main boost circuit 12a is provided with a smoothing capacitor C1 on the side of the fuel cell 11, whereby a ripple of the output current of the fuel cell 11 can be reduced. A voltage VH applied to this smoothing capacitor C3 becomes an outlet port voltage of the FC boost converter 12. Further, in FIG. 2, VL represents the power source voltage of the fuel cell 11, which is the voltage applied to the smoothing capacitor C1 and becomes an inlet port voltage of the FC boost converter 12.

Next, the auxiliary circuit 12b, at first, embraces a first series connector including a diode D3 connected in parallel to the switching element S1 and a snubber capacitor C2 connected in series to the diode D3. In this first series connecting module, a cathode terminal of the diode D3 is connected to the other end of the coil L1, and an anode terminal thereof is connected to one end of the snubber capacitor C2. Moreover, the other end of the snubber capacitor C2 is connected to the terminal, on the low current side, of the fuel cell 11. Further, the auxiliary circuit 12b embraces a second series connecting module in which a coil L2 defined as an induction element, a diode D2 and a switching circuit constructed of a switching element S2 and a diode D1 are connected in series. In the second series connecting module, one end of the coil L2 is connected to a connecting point between the diode D3 and the snubber capacitor C2 of the first series connecting module. Moreover, the cathode terminal of the diode D2 is connected to the other end of the coil L2, and the anode terminal thereof is connected to one end of the switching element S2. Moreover, the other end of the switching element S2 is connected to one end side of the coil L1. Note that a circuit topology of the second series connecting module can adopt a mode of properly exchanging the series order of the switching circuit including the coil L2, the diode D2, the switching element S2, etc. Especially, as a substitute for the state illustrated in FIG. 2, the coil L1 and the coil L2 can be integrated in an actual packaging circuit by exchanging the order of the switching circuit including the coil L2, the switching element S2, etc, and the modularization of the semiconductor elements is facilitated.

The thus-configured FC boost converter 12 adjusts a switching duty ratio of the switching element S1, thereby controlling a boost ratio of the FC boost converter 12, i.e., controlling a ratio of the output voltage of the FC boost converter 12 that is applied to the inverter 15 to the output voltage of the fuel cell 11 that is inputted to the FC boost converter 12. Further, the so-called soft switching, which will be described later of, is realized in such a way that the switching operation of the switching element S2 of the auxiliary circuit 12b intervenes in the switching operation of the switching element S1, thereby enabling a switching loss in the FC boost converter 12 to be reduced to a great degree.

Figure 3:
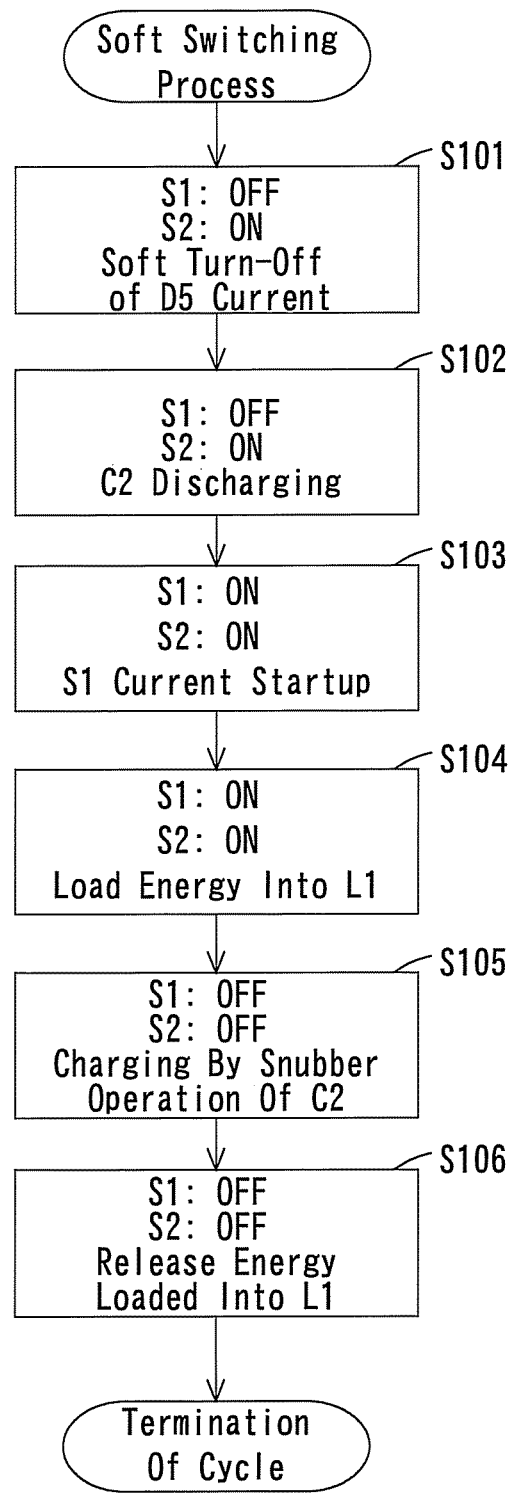
FIG. 3 A flowchart showing a flow of a soft switching process for boosting the voltage, which conducted by the FC boost converter shown in FIG. 2.

Next, the soft switching of the FC boost converter 12 will be discussed based on FIGS. 3 and 4A through 4F. FIG. 3 is a flowchart of a one-cycle process (which will hereinafter be referred to as a [soft switching process]) for the boosting of the FC boost converter 12 via the soft switching operation. In the soft switching process, the ECU 20 sequentially executes respective processes in S101 through S106 to thereby organize one cycle, in which flow modes of the current and the voltage in the FC boost converter 12 are expressed by a mode 1 to a mode 6, and FIGS. 4A through 4F show states thereof. The soft switching process of the FC boost converter 12 will hereinafter be described based on these drawings. Incidentally, FIGS. 4A through 4F omit the description of reference numerals of the main boost circuit 12a and the auxiliary circuit 12b for simplifying the illustrations in the drawings, however, there is a case of quoting the respective circuits in the explanations of the individual modes. Further, what is indicated by a bold arrowhead implies the current flowing across the circuit.

Note that an initial state in which the soft switching process shown in FIG. 3 is executed is a state where the inverter 15 and the motor 16 are supplied with the power from the fuel cell 11, i.e., a state where the current flows toward the inverter 15 via the coil L1 and the diode D5 by turning OFF both of the switching elements S1 and S2. Accordingly, upon termination of one cycle of the soft switching process, it follows that the operation reaches the state equal to the initial state.

Figure 4A:
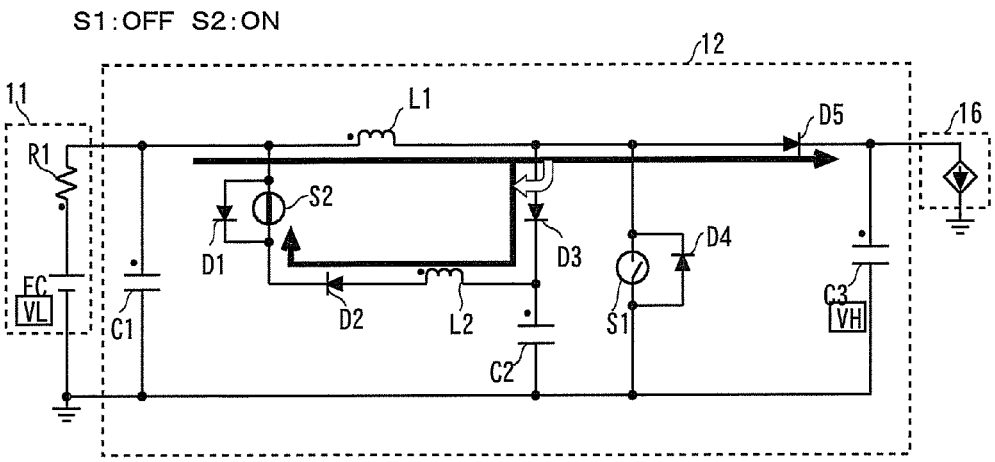
FIG. 4A A diagram schematically showing a flow of current in the FC boost converter when performing an operation of a mode 1 in the soft switching process shown in FIG. 3.

In the soft switching process, to begin with, the current/voltage state of the mode 1 illustrated in FIG. 4A occurs in S101. To be specific, the switching element S1 in the turn-OFF state turns ON the switching element S2. With the operation being thus done, the current flowing toward the inverter 15 via the coil L1 and the diode D5 gradually diverts towards the auxiliary circuit 12b due to a potential difference between the outlet port voltage VH and the inlet port voltage VL of the FC boost converter 12. Incidentally, a solid-white arrowhead shows a state of how the current diverts in FIG. 4A.

Figure 4B:
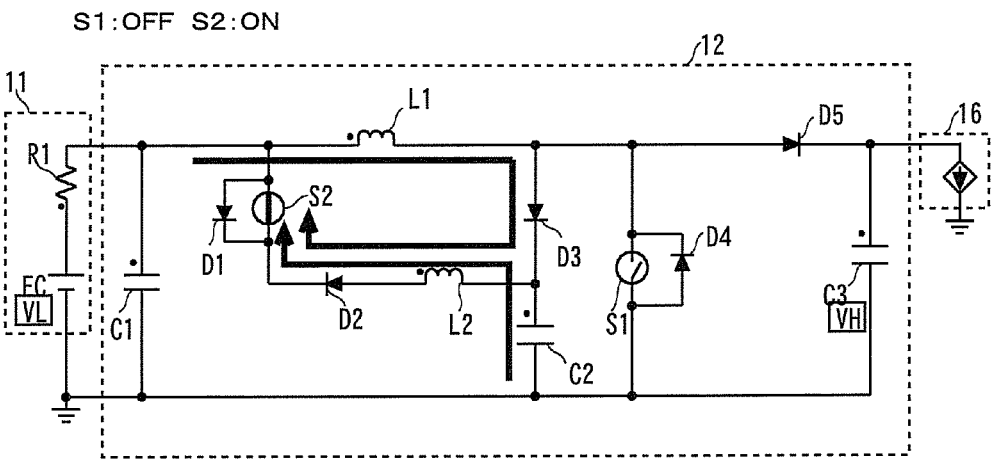
FIG. 4B A diagram schematically showing the flow of current in the FC boost converter when performing an operation of a mode 2 in the soft switching process shown in FIG. 3.

Next, in S102, if the state in S101 continues for a predetermined period of time, the current flowing across the diode D5 becomes zero, and, instead, the electric charge accumulated in the snubber capacitor C2 flows in on the side of the auxiliary circuit 12b due to the potential difference between the voltage of the snubber capacitor C2 and the voltage VL of the fuel cell 11 (a state of the mode 2 shown in FIG. 4B). The snubber capacitor C2 has a function of determining the voltage applied to the switching element S1. The electric charge of the snubber capacitor C2, which affects the voltage applied to the switching element S1 when tuning OFF the switching element S1, flows in the auxiliary circuit 12b in the mode 2, with the result that the voltage applied to the snubber capacitor C2 decreases. At this time, the current continues to flow till the voltage of the snubber capacitor C2 reaches zero due to a half-wave resonance between the coil L2 and the snubber capacitor C2. As a result, the applied voltage can be decreased when turning ON the switching element S1 in S103 that will be explained later on.

Figure 4C:
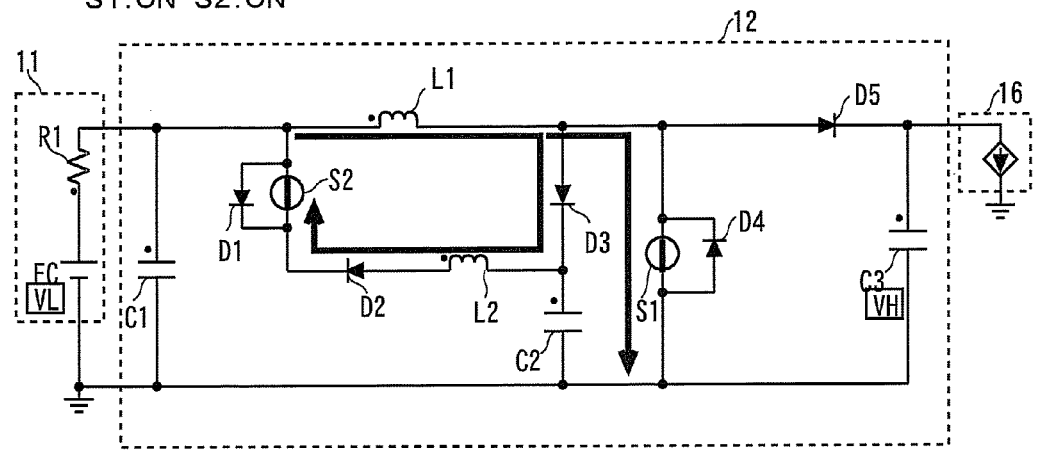
FIG. 4C A diagram schematically showing the flow of current in the FC boost converter when performing an operation of a mode 3 in the soft switching process shown in FIG. 3.
Figure 4D:
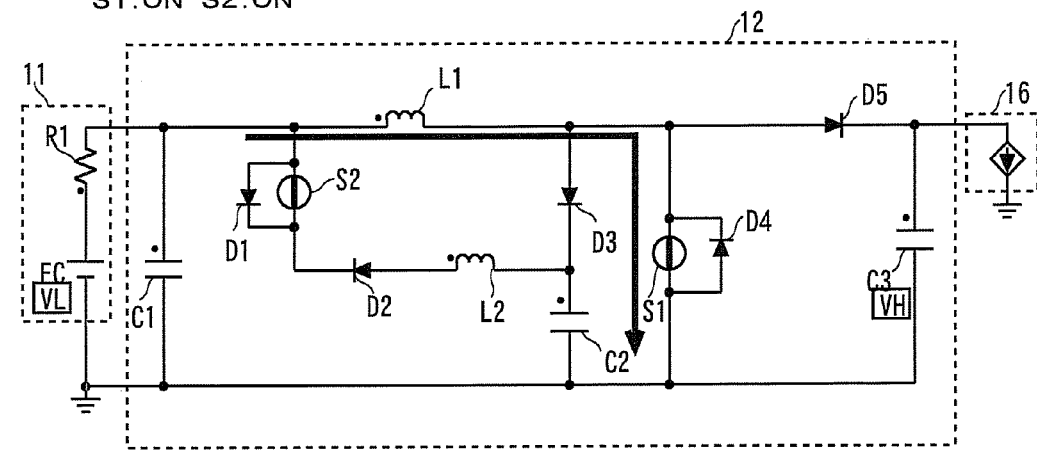
FIG. 4D A diagram schematically showing the flow of current in the FC boost converter when performing an operation of a mode 4 in the soft switching process shown in FIG. 3.
Figure 4E:
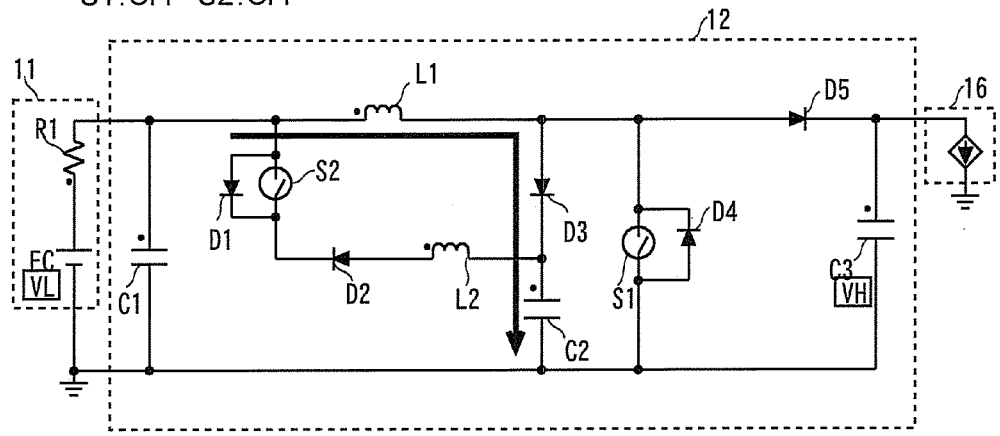
FIG. 4E A diagram schematically showing the flow of current in the FC boost converter when performing an operation of a mode 5 in the soft switching process shown in FIG. 3.
Figure 4F:
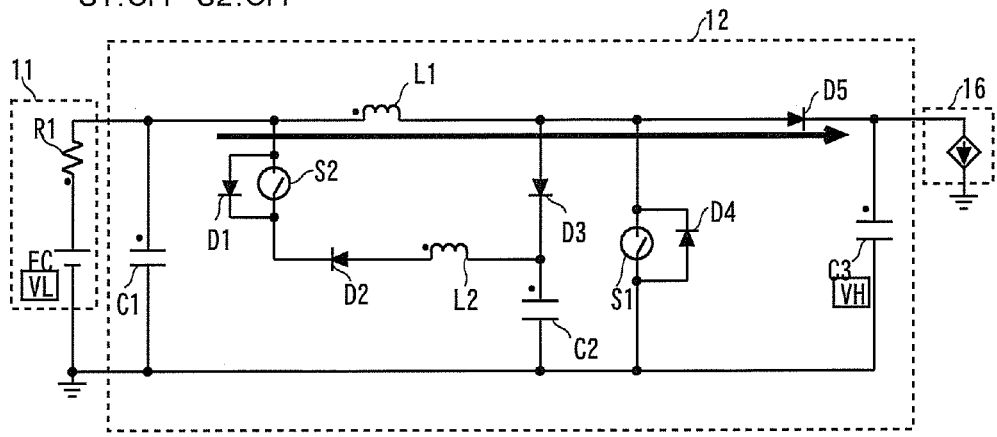
FIG. 4F A diagram schematically showing the flow of current in the FC boost converter when performing an operation of a mode 6 in the soft switching process shown in FIG. 3.

Furthermore, in S103, when the electric charge of the snubber capacitor C2 is dissipated completely, the switching element S1 is further turned ON, and the current/voltage state in the mode 3 shown in FIG. 4C occurs. Namely, in the state where the voltage of the snubber capacitor C2 becomes zero, the voltage applied to the switching element S1 also comes to zero, and, after setting the switching element S1 in the zero-voltage state by, then, turning ON the switching element S1 in that state, the switching loss in the switching element S1 can be set theoretically to zero because of the current starting flowing there.

Then, in S104, with the continuation of the state in S103, a quantity of the current flowing in the coil L1 is augmented to thereby gradually increase the energy accumulated in the coil L1. This state is the current/voltage state of the mode 4 illustrated in FIG. 4D. Thereafter, when the desired energy is accumulated in the coil L1, in S105, the switching elements S1 and S2 are turned OFF. Then, the snubber capacitor C2, which has become the low voltage state with the electric charge being dissipated in the mode 2, is charged with the electric charge and reaches the same voltage as the outlet port voltage VH of the FC boost converter 12. This state is the current/voltage state of the mode 5 shown in FIG. 4E. Then, when the snubber capacitor C2 is charged with the electricity up to the voltage VH, the energy accumulated in the coil L1 in S106 is released toward the inverter 15. This state is the current/voltage state of the mode 6 shown in FIG. 4F. Incidentally, when the mode 5 is carried out, a startup of the voltage applied to the switching element S1 is delayed by the snubber capacitor C2, whereby the switching loss due to a tail current in the switching element S1 can be reduced to a greater degree.

As discussed above, the switching loss in the FC boost converter 12 is restrained to the greatest possible degree by executing the soft switching process of which one cycle is organized by the processes in S101 through S106, and thereafter the output voltage of the fuel cell 11 is boosted and thus can be supplied to the inverter 15. As a result, the motor 16 classified as the high-voltage low-current motor can be efficiently actuated.

Figure 5:
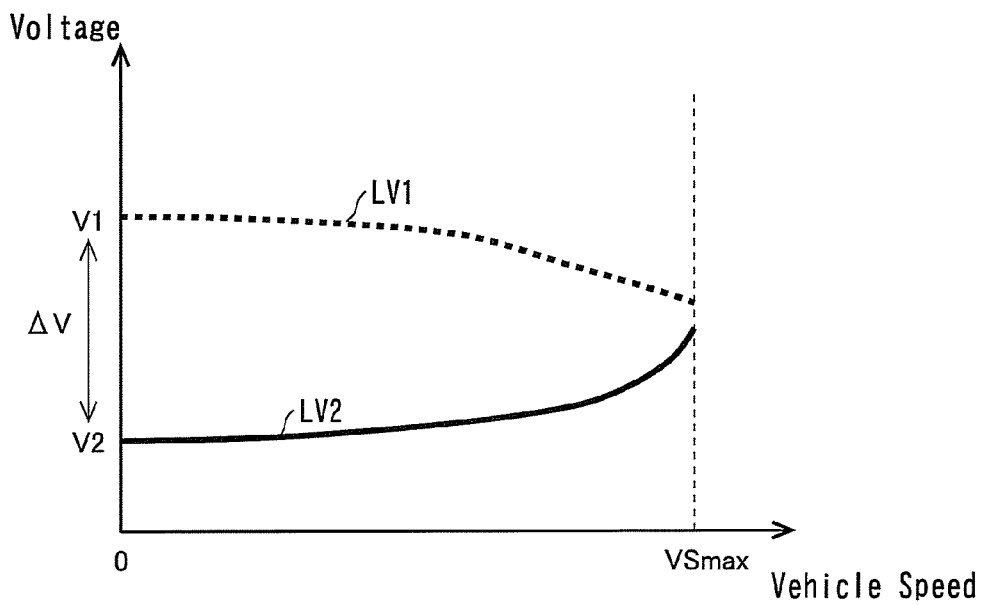
FIG. 5 A diagram showing a correlation between an output voltage of the fuel cell and a motor necessary voltage for actuating a motor, which are set in a conventional fuel cell system.

Herein, in the fuel cell system 10, in addition to the soft switching process described above, intermittent operation control of the FC boost converter 12 is performed, thereby improving the system efficiency. For simplifying the discussion, when focusing on a relationship between the fuel cell 11, the inverter 15 and the motor 16, the power from the fuel cell 11 serving as the main power source for the motor 16 is supplied to the side of the inverter 15 via the FC boost converter 12. Then, the voltage, which should be applied to the inverter 15 on such an occasion that the fuel cell 11 as the main power source actuates the motor 16, must be the voltage large enough to resist the counter electromotive force (voltage) of the motor 16. Accordingly, the conventional fuel cell system equipped with none of the FC boost converter 12 must be set in a state where, as illustrated in FIG. 5, in a speed range (0 to VSmax) that can be taken by the vehicle 1, a voltage denoted by LV1, which is applied by the fuel cell 11, always exceeds a voltage that is necessary for actuating the motor and should be applied to the inverter (which will hereinafter be termed a [motor necessary voltage]). For attaining this, the voltage exceeding largely the voltage that should be applied to the inverter is, it follows, applied to the inverter, resulting in the large switching loss of the inverter. Then, in an area where the speed of the vehicle 1 is low, a remarkable switching loss of the inverter might occur.

Herein, in the fuel cell system 10 according to the present invention, because of providing the FC boost converter 12, the voltage from the fuel cell 11 is boosted and thus can be applied to the inverter 15. The boost operation of this FC boost converter 12 undergoes, however, the occurrence of some kind of switching loss due to the switching element and therefore becomes one factor for decreasing the system efficiency. On the other hand, as described above, the motor is the motor based on the high voltage/high current specifications, and the counter electromotive force generated with the rise in the number of revolutions increases, and the boost operation of the FC boost converter 12 is indispensable.

Figure 6:
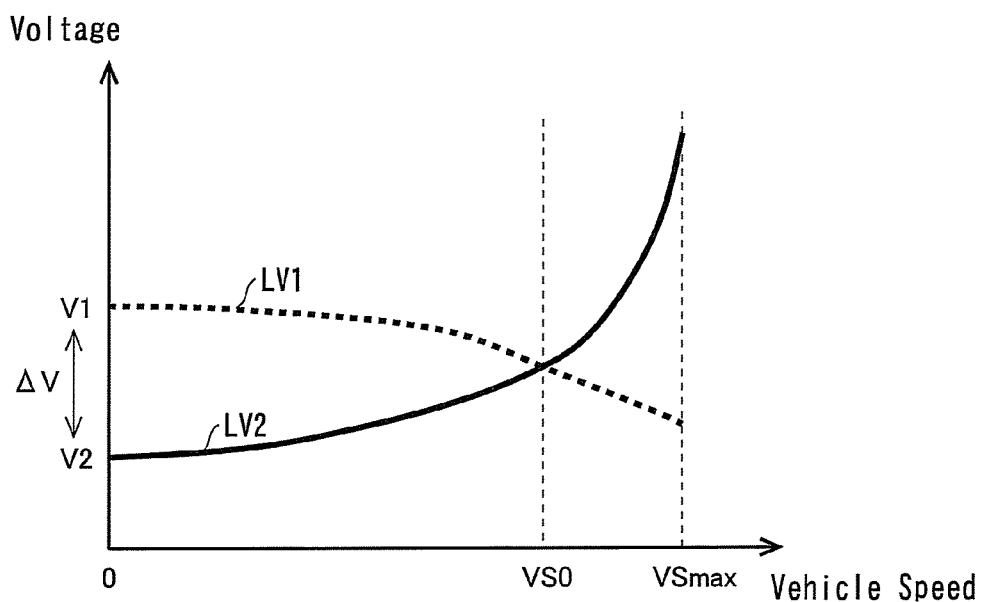
FIG. 6 A diagram showing a correlation between the output voltage of the fuel cell and the motor necessary voltage for actuating the motor, which are set in the fuel cell system according to the working example of the present invention.

Such being the case, a correlation between the output voltage from the fuel cell 11 and the motor necessary voltage that should be applied to the inverter 15 is expressed by LV1 and LV2 respectively in FIG. 6. As indicated by LV2 in FIG. 6, the counter electromotive force (voltage) of the motor 16 rises as the speed of the vehicle 1 increases, and hence the motor necessary voltage also rises as the speed of the vehicle increase. Herein, the voltage characteristic of the fuel cell 11 and the voltage characteristic of the motor 16 may be determined so that in the correlation between the output voltage LV1 of the fuel cell 11 and the motor necessary voltage LV2, a speed VS0 of the vehicle 1 when both of the voltages LV1 and LV2 intersect each other becomes a speed at which the user performs substantially the normal operation of the vehicle 1. In the first working example, VS0 is set to 110 km/h from the laws and regulations for driving the vehicle, a tendency of the user's normal operation, etc. Then, a maximum output enabling the vehicle 1 to travel at this speed VS0 when actuating the motor 16 is calculated, and the voltage (the motor necessary voltage), which should be applied to the inverter 15, is derived so as to enable the maximum output to be exhibited. Then, the fuel cell 11 is designed (e.g., a stack cell count is adjusted etc in the fuel cell built up by stacking the plurality of cells) so that the motor necessary voltage can be output directly from the fuel cell 11 without via the FC boost converter 12.

In the fuel cell system 10 including the thus-designed fuel cell 11, during a period till the speed of the vehicle 1 reaches VS0, the output voltage from the fuel cell 11 is higher than the motor necessary voltage for actuating the motor 16, and hence, even when the motor 16 is the motor based on the high voltage/high current specifications, the motor 16 can be actuated by the output voltage directly from the fuel cell 11 without the boost operation of the FC boost converter 12. In other words, under this condition, it follows that the actuation of the motor 16 can be ensured by stopping the switching operation of the FC boost converter 12 and applying the output voltage from the fuel cell 11 to the inverter 15. With this contrivance, the switching loss in the FC boost converter 12 can be completely excluded. Furthermore, the voltage applied to the inverter 15 does not become excessively high due to the stop of the FC boost converter 12, i.e., the voltage difference between LV1 and LV2 can be restrained smaller than in the state illustrated in FIG. 5, and therefore the switching loss in the inverter 15 can be restrained low. It should be noted that in FIG. 6, the drive range (the drive range of the motor 16, in which the vehicle 1 is set at a speed 0-VS0) of the motor 16 that exhibits a state where the output voltage of the fuel cell 11 is higher than the motor necessary voltage, corresponds to a predetermined drive range according to the present invention.

On the other hand, when the vehicle speed of the vehicle 1 becomes equal to or higher than VS0, reversely the motor necessary voltage for actuating the motor 16 is higher than the output voltage from the fuel cell 11, and hence the boost operation of the FC boost converter 12 is required. In this case, the switching loss in the FC boost converter 12 can be restrained to the greatest possible degree by executing the soft switching process described above.

What has been discussed so far puts the focus on only the correlation between the fuel cell 11 and the motor 16 for the simplicity of the explanation, however, as illustrated in FIG. 1, in the fuel cell system 1, the motor 16 can be supplied with the electric power from the battery 13. In the case of being supplied with the electric power from the battery 13, the output voltage from the battery 13 is boosted by the battery boost converter 14 and is thereafter applied to the inverter 15. Herein, the battery boost converter 14 is the so-called boost converter, and hence the voltage must be set in the same or higher state as or than the outlet port voltage of the battery boost converter 14 (which is the voltage on the side of the inverter 15 and is equal to the outlet port voltage of the FC boost converter 12) in order to supply the power to the inverter 15 from the battery 13.

Figure 7A:
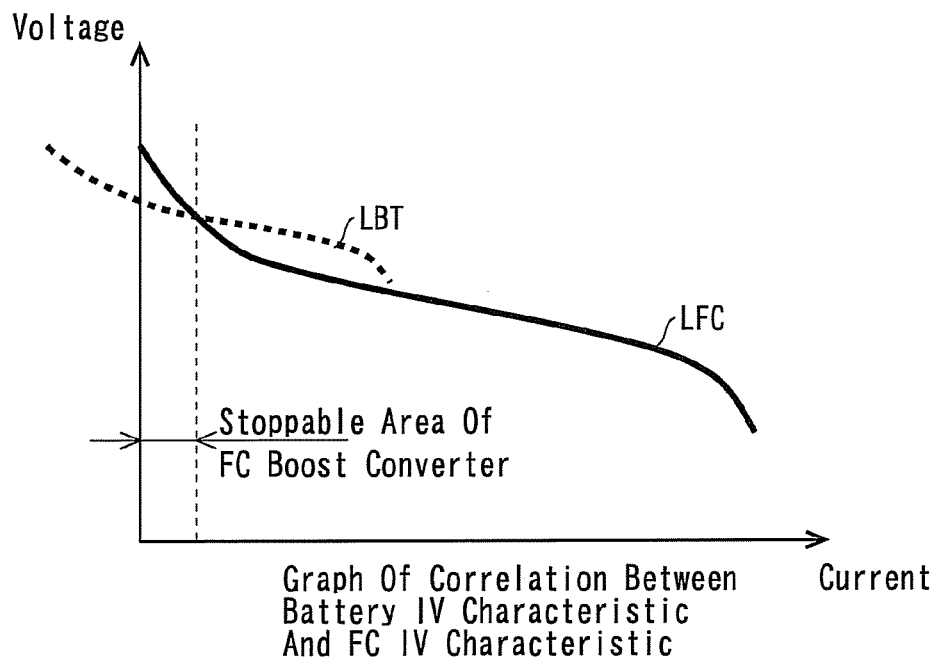
FIG. 7A A first diagram showing a correlation between an IV characteristic of the fuel cell and an IV characteristic of the battery, which are set in the fuel cell system according to the working example of the present invention.
Figure 7B:
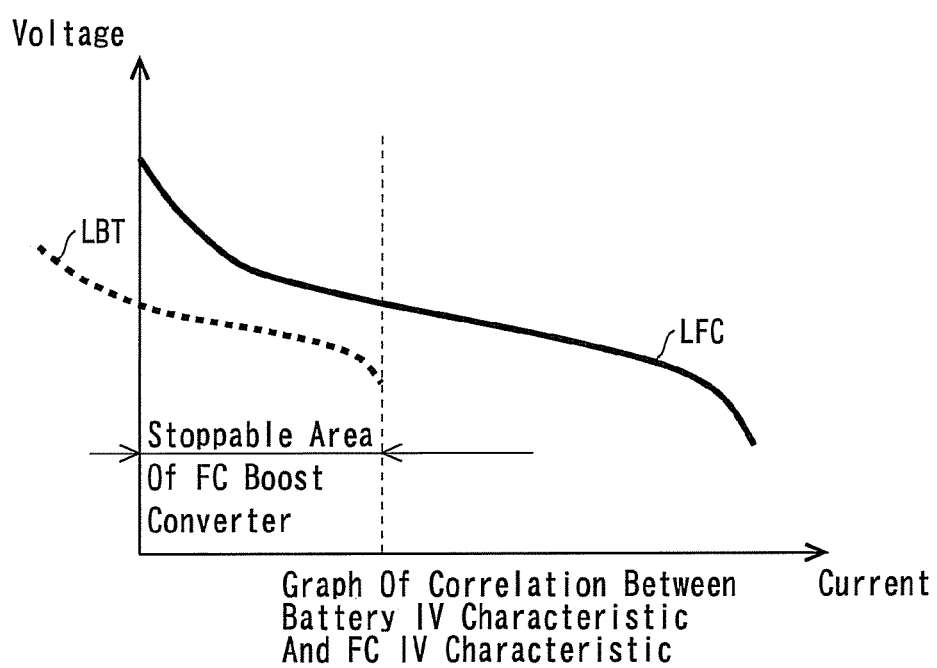
FIG. 7B A second diagram showing the correlation between the IV characteristic of the fuel cell and the IV characteristic of the battery, which are set in the fuel cell system according to the working example of the present invention.

This being the case, the correlation between the output voltage of the battery 13 and the output voltage of the fuel cell 11 will be explained based on FIGS. 7A and 7B. Both of FIGS. 7A and 7B show an IV characteristic (indicated by a solid line LET in the drawings) of the battery 13 and the IV characteristic (indicated by a solid line LFC in the drawings) of the fuel cell 11. Herein, in FIG. 7A, in an area where the IV characteristic LFC of the fuel cell 11 is higher than the IV characteristic LBT of the battery 13, the output voltage of the battery 13 reaches a state of being lower than the output voltage of the FC boost converter 12 even by stopping the FC boost converter 12, so that the battery boost converter 14 gets capable of performing the boost operation, whereby the motor 16 can be supplied with the electric power from the battery 13. Accordingly, in this state, the stop of the operation of the FC boost converter 12 is permitted. On the other hand, in an area where the IV characteristic LET of the battery 13 is higher than the IV characteristic LFC of the fuel cell 11, if the FC boost converter 12 is stopped, the output voltage of the battery 13 reaches a state of being higher than the output voltage of the FC boost converter 12, and it is therefore impossible to control a distribution of the outputs of the fuel cell 11 and the battery 13 through the boost operation of the battery boost converter 14. Accordingly, in this state, the stop of the operation of the FC boost converter 12 is not permitted.

Namely, the battery boost converter 14 boosts the output voltage from the battery 13, and the voltage is applied to the motor 16, in which case there is a necessity for generating the state where the outlet port voltage of the FC boost converter 12 is higher than the output voltage of the battery 13 (the inlet port voltage of the battery boost converter 14) and there is also a case where the stop of the operation of the FC boost converter 12 is not consequently permitted. For example, as illustrated in FIG. 7A, if the IV characteristic LFC of the fuel cell 11 is lower than the IV characteristic LBT of the battery 13 in the comparatively low current area, the stop of the operation of the FC boost converter 12 is not permitted for ensuring the boost operation of the battery boost converter 14, and, as a result, there decreases the possibility of scheming to reduce the switching loss. While on the other hand, for instance, as depicted in FIG. 7B, if the IV characteristic LFC of the fuel cell 11 is always higher than the IV characteristic LET of the battery 13, it does not happen that the stop of the operation of the FC boost converter 12 is restricted in terms of ensuring the boost operation of the battery boost converter 14. In FIGS. 7A, 7B, the drive range of the motor 16, in which the IV characteristic LBT of the battery 13 is lower than the IV characteristic LFC, corresponds to a second predetermined drive range according to the present invention.

The restriction of the operation of the FC boost converter 12 with respect to ensuring the boost operation of the battery boost converter 14, which has been discussed so far, is attributable to the point that the battery boost converter 14 included in the fuel cell system 10 illustrated in FIG. 1 is the boost type converter (i.e., the converter incapable of performing buck operation (depressurization)). Accordingly, in the fuel cell system 10, in the case of adopting the buck-boost converter capable of performing the boost operation and the buck operation in place of the battery boost converter 14, the FC boost converter 12 can selectively apply the output voltages from the fuel cell 11 and the battery 13 to the motor 16 without being bounded to the operational restriction described above.

Figure 8A:
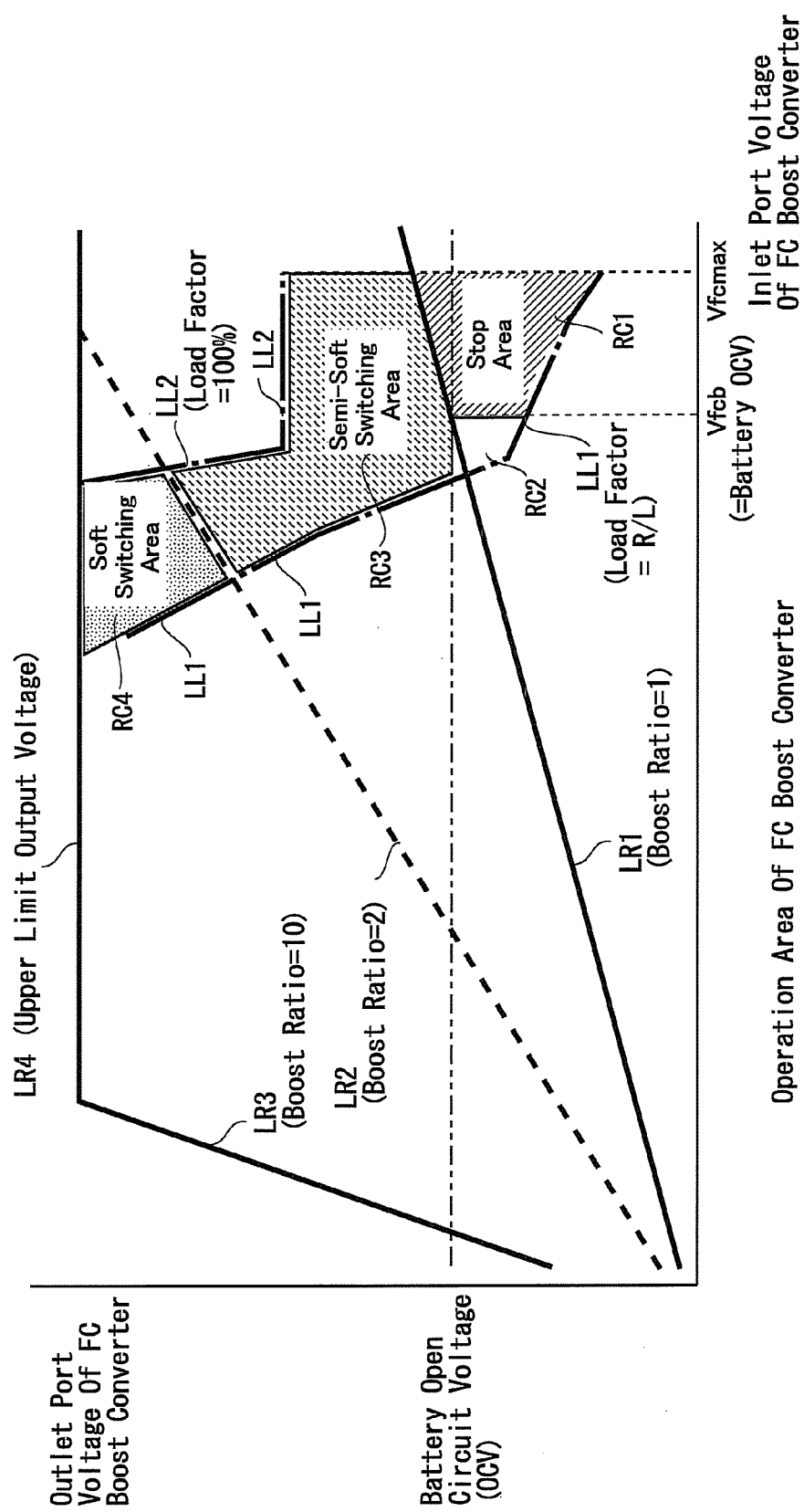
FIG. 8A A first map showing a process executed by the FC boost converter in a way that associates the process with an operation area formed by giving an inlet port voltage of the FC boost converter along the axis of abscissa and an outlet port voltage thereof along the axis of ordinates in the fuel cell according to the working example of the present invention.
Figure 8B:
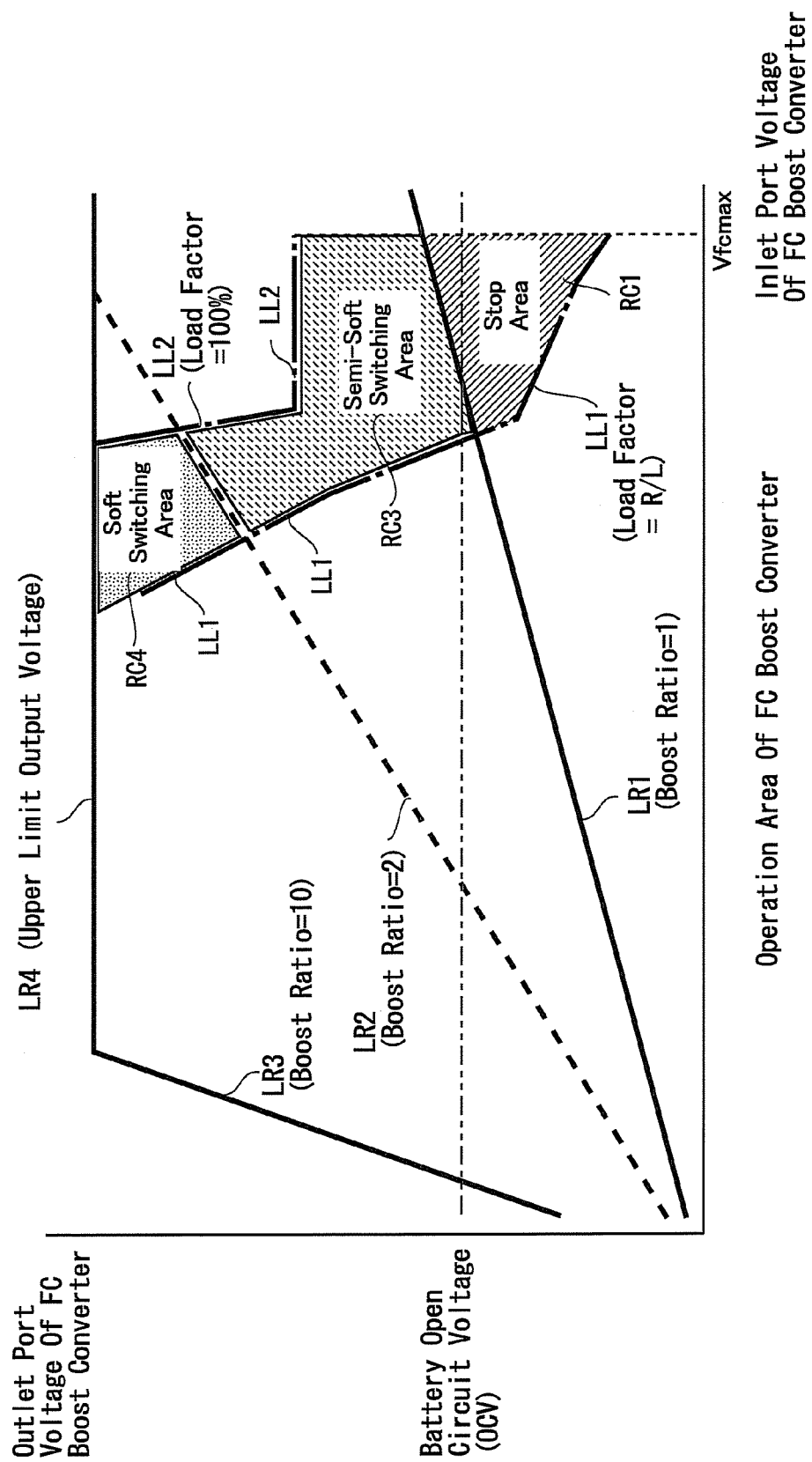
FIG. 8B A second map showing the process executed by the FC boost converter in a way that associates the process with the operation area formed by giving the inlet port voltage of the FC boost converter along the axis of abscissa and the outlet port voltage thereof along the axis of ordinates in the fuel cell according to the working example of the present invention.

From what has been discussed above, in the first working example, the IV characteristic of the battery 13 and the IV characteristic of the fuel cell 11, which are needed for the assumed drive of the vehicle 1, are determined, and the control area for the boost operation of the FC boost converter 12 as shown in maps of FIGS. 8A and 8B is defined from the correlation between the two IV characteristics and the relation between the output voltage of the fuel cell 11 and the motor necessary voltage. The following is an in-depth description of the boost operation of the FC boost converter 12.

FIGS. 8A and 8B are the maps in which the processes executed in the FC boost converter 12 are displayed in the way of being related to operation areas formed by giving the inlet port voltage of the FC boost converter 12 along the axis of abscissa and the outlet port voltage thereof along the axis of ordinates. Note that FIG. 8A is the map formed when the battery boost converter 14 included in the fuel cell system 10 is the boost type converter, and FIG. 8B is the map formed when adopting the buck-boost converter in place of the boost type battery boost converter 14. To start with, the map illustrated in FIG. 8A will be described. Herein, the map shows a rectilinear line LR1 signifying that a boost ratio of the FC boost converter 12 is 1, i.e., that the ratio of the inlet port voltage to the outlet port voltage is 1:1, a rectilinear line LR2 signifying that the boost ratio takes a value in the vicinity of 2 (simply, [2] is given as the boost ratio in the drawings), a rectilinear line LR3 signifying that the boost ratio is 10, and a rectilinear line LR4 signifying the maximum output voltage of the FC boost converter 12. The rectilinear line LR2 will hereinafter be described based on FIGS. 9, 10A and 10B. Further, the rectilinear line LR3 represents the maximum boost ratio of the FC boost converter 12. Accordingly, it is recognized that the operation range of the FC boost converter 12 is an area circumscribed by the rectilinear lines LR1, LR3 and LR4.

Herein, in an assumed speed range of the vehicle 1, a one-dotted chain line LL1 represents a relation between the inlet port voltage and the outlet port voltage of the FC boost converter 12 in the case where the load applied to the motor 16 is lowest, i.e., the load substantially corresponding to a frictional resistance on the road (which is given by the load factor=R/L (Road Load)) is applied to the motor 16. On the other hand, similarly in the assumed speed range of the vehicle 1, a one-dotted chain line LL2 represents a relation between the inlet port voltage and the outlet port voltage of the FC boost converter 12 in the case where the load applied to the motor 16 is highest, i.e., the accelerator opening degree of the vehicle 1 is 100% (the load factor=100% given in FIGS. 8A, 8B). Accordingly, it follows that the fuel cell system 10 mounted in the vehicle 1 makes the FC boost converter 12 perform the boost operation indicated by the area circumscribed by the one-dotted chain lines LL1 and LL2 in terms of driving the vehicle 1.

In the map illustrated in FIG. 8A, the operation area of the FC boost converter 12 is segmented into four segment areas RC1-RC4. In these areas, characteristic operations of the operation of the FC boost converter 12 are carried out, and the operation of the FC boost converter 12 in each segment area will hereinafter be described. To begin with, the area RC1 is defined as the area under the rectilinear line LR1 representing the boost ratio 1. In this area RC1, the boost ratio needed for actuating the motor 16 is equal to or smaller than 1 (It should be noted that in fact, the boost ratio is set equal to or smaller than 1, i.e., the buck operation (depressurization) can not be done because of the FC boost converter 12 being classified as the boost converter.), and hence the output voltage of the fuel cell 11 can be resultantly applied directly to the inverter 15 in a way that stops the FC boost converter 12. Then, the boost operation of the FC boost converter 12 is completely stopped in the range where the output voltage, serving as the inlet port voltage of the FC boost converter 12, of the fuel cell 11 is between the maximum voltage Vfcmax of the fuel cell 11 and Vfcb taking the same value as that of an open circuit voltage (OCV) of the battery 13 and in the area RC1 defined in the way of being circumscribed by the rectilinear line LR1 and the one-dotted chain line LL1. This stoppage can restrain the switching loss in the FC boost converter 12. Thus, it is because the battery boost converter 14 is, as stated above, the boost type converter and the boost operation thereof is ensured that the operation stop of the FC boost converter 12 undergoes the restraint at the boundary of the voltage Vfcb.

Next, the area R2 will be described. This area RC2 is defined as an area where the inlet port voltage of the FC boost converter 12 is equal to or smaller than Vfcb and the outlet port voltage of the FC boost converter 12 is equal to or smaller than OCV of the battery 13, i.e., this outlet port voltage is equal to or smaller than the voltage taking the same value of Vfcb. Namely, the area RC2 is the area where if the boost operation of the FC boost converter 12 is not conducted, the outlet port voltage of the battery boost converter 14 becomes lower than the inlet port voltage with the result that the boost operation of the battery boost converter 14 can not be performed, and is also the area where even if the boost operation of the FC boost converter 12 is conducted, the boost operation of the battery boost converter 14 can not be conducted similarly because the boost ratio thereof is low.

In the thus-defined area RC2, similarly to the area RC1, the switching loss is not caused by stopping the FC boost converter 12. Then, the terminal voltage of the fuel cell 11 is controlled down to the lowest voltage controllable by the battery boost converter 14. Note that Vfcb in the drawings is set on the assumption that in the case of using the idealistic boost converter, the voltage thereof is equal to OCV. This state continues as far as the discharge power of the battery 13 permits.

It is to be noted that this area RC2 is a transient area via which the operation area of the FC boost converter 12 transitions to the area RC that will be described later on from the area RC1 described above during the transition of the actuation state of the motor 16. Accordingly, if the battery boost converter 14 is the boost type converter, the correlation between the IV characteristic of the fuel cell 11 and the IV characteristic of the battery 13, which have been described based on FIGS. 7A and 7B are, it is preferable, properly adjusted so that this transient area RC2 is reduced to the greatest possible degree.

Herein, the map illustrated in FIG. 8B, i.e., the map formed when the fuel cell system 10 adopts the buck-boost converter in place of the battery boost converter 14 in the area under the rectilinear line LR1, will be explained. In this case, the output voltage of the battery 13 can be stepped down by the buck-boost converter, and therefore, as described above, the operation stop of the FC boost converter 12 undergoes none of the restraint of the voltage Vfcb. Accordingly, as shown in FIG. 8B, in the area under the rectilinear line LR1, the improvement of the system efficiency is facilitated without restraint of the operation of the FC boost converter 12. Accordingly, as a result, it follows that the area corresponding to the area RC2 does not exist in FIG. 8B. Herein, the descriptions of the maps that will be given as below are applied in common to FIGS. 8A and 8B and therefore made en bloc.

In the operation area other than the areas RC1, RC2 described so far, the boost operation of the output voltage of the fuel cell 11 is carried out by actuating the FC boost converter 12. In this boost operation, the soft switching process explained based on FIGS. 4A-4F is executed, and the switching loss in the FC boost converter 12 is restrained to the greatest possible degree. Herein, the operation area where the soft switching process is executed is segmented by the rectilinear line LR2 into the semi-soft switching area RC3 and the soft switching area RC4. The semi-soft switching area RC3 and the soft switching area RC4 will be described in detail.

To start with, a technical significance of the rectilinear line LR2 will be explained. As described above, the rectilinear line LR2 is the rectilinear line signifying that the boost ratio of the FC boost converter 12 takes the value in the vicinity of 2. An electrical structure of the FC boost converter 12 according to the present invention is as illustrated in FIG. 2, however, in the operation of the mode 2 in a series of flows of the soft switching process described above, the snubber capacitor C2 is discharged by utilizing the half-wave resonance involving the use of the coil L2 of the auxiliary circuit 12b and the snubber capacitor C2. In the operation of the mode 2, when extracting only the actually working elements within the FC boost converter 12, a circuit configuration becomes as depicted in FIG. 9.

Figure 9:
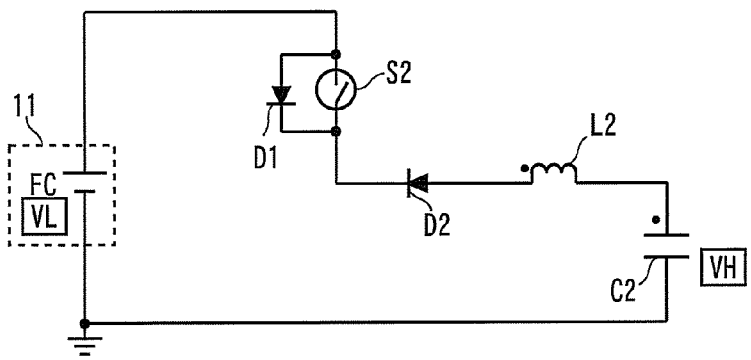
FIG. 9 A diagram showing an extraction of only actually working portions within the FC boost converter for the explanation's sake when performing the operation of the mode 2 in the soft switching process shown in FIG. 3.

Then, in the circuit configuration illustrated in FIG. 9, unless the electric charge charged in the snubber capacitor C2 is completely discharged, the current caused due to the turn-ON of the switching element S1 flows in the state where the voltage is applied to the switching element S1 in the operation of the subsequent mode 3, resulting in the occurrence of the switching loss. Accordingly, it is important to completely discharge, it is understood, the electric charge of the snubber capacitor C2 in this mode 2, however, for attaining this discharge, the energy accumulated in the coil L2 must be larger than the energy accumulated in the snubber capacitor C2 at the point of the operation of the mode 1. In other words, the outlet port voltage VH of the FC boost converter 12 must be higher by a predetermined quantity or above than the inlet port voltage VL thereof.

Figure 10A:
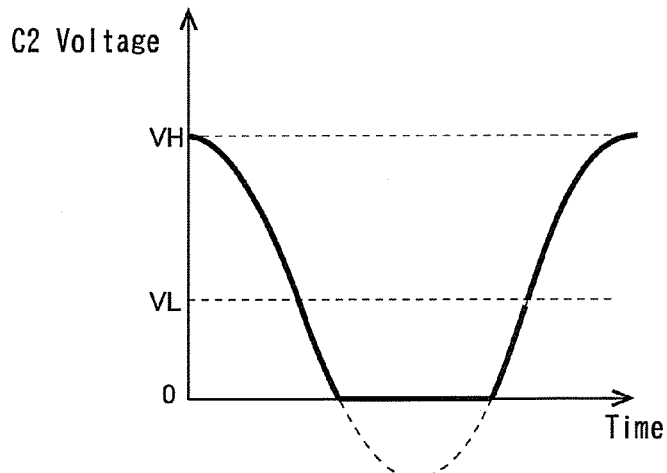
FIG. 10A A first diagram illustrating a correlation between a ratio VH/VL between the outlet port voltage of the FC boost converter according to the working example of the present invention and the inlet port voltage thereof and a residual voltage in the snubber capacitor when discharged in the case of performing the operation of the mode 2 of the soft switching process shown in FIG. 3.
Figure 10B:
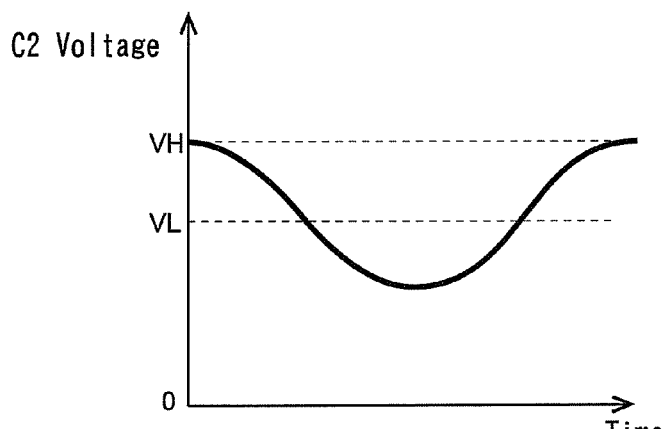
FIG. 10B A second diagram illustrating the correlation between the ratio VH/VL between the outlet port voltage of the FC boost converter according to the working example of the present invention and the inlet port voltage thereof and a residual voltage in the snubber capacitor when discharged in the case of performing the operation of the mode 2 of the soft switching process shown in FIG. 3.

Such being the case, a relation between an outlet port voltage/inlet port voltage ratio VH/VL and a residual voltage in the snubber capacitor C2 will be explained based on FIGS. 10A an 10B. Note that FIG. 10A shows a transition of the voltage of the snubber capacitor C2 if the ratio VH/VL exceeds 2, and FIG. 10B shows the transition of the voltage of the snubber capacitor C2 if the ratio VH/VL is less than 2. In the case illustrated in FIG. 10A, the value of VH-VL is larger than VL, and hence, if the half-wave resonance occurs, the voltage of the snubber capacitor C2 becomes to zero with the action of the diode D2. On the other hand, in the case illustrated in FIG. 10B, the value of VH-VL is smaller than VL, and therefore it follows that even when the half-wave resonance occurs, the voltage of the snubber capacitor C2 is left by a fixed value or more. Accordingly, even when the soft switching process is executed in such a case, it follows that the switching loss is produced. From what has been discussed so far, it follows that the rectilinear line LR2 exists as a criterion for determining whether the switching loss due to the soft switching process is effectively restrained or not.

It should be noted that if the ratio VH/VL is theoretically twice or more, the voltage of the snubber capacitor C2 after being discharged comes to zero, however, the ratio VH/VL takes a value (e.g., 2.3 etc) over the 2-fold value because the energy loss actually occurs in the diode and within the wiring. Then, in the operation area circumscribed by the one-dotted chain lines LL1 and LL2, the area excluding the segment areas RC1, RC2 is segmented by the rectilinear line LR2 into two areas, in which the area positioned under the rectilinear line LR2 is set as the semi-soft switching area RC3 where the switching loss is hard to be efficiently restrained even by executing the soft switching process for the reason elucidated above, while the area positioned above the rectilinear line LR2 is set as the soft switching area RC4 where the switching loss is efficiently restrained in the soft switching process.

Figure 11A:
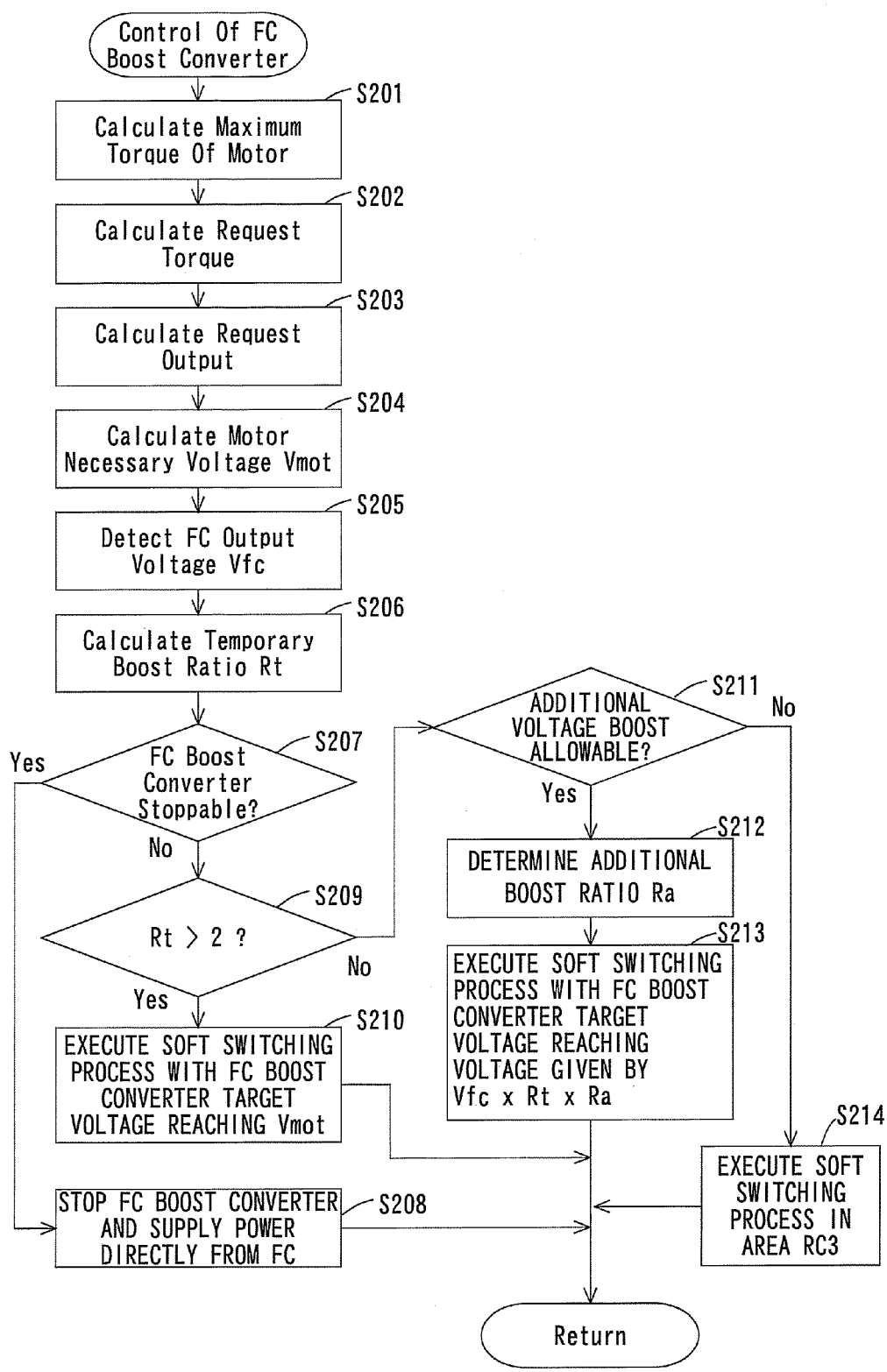
FIG. 11A A flowchart illustrating a flow of control conducted by the FC boost converter for accelerating efficiency of the fuel cell system according to the working example of the present invention.

Thus, the operation area of the FC boost converter 12 can be divided into the predetermined areas RC1-RC4, however, in the semi-soft switching area RC3, as discussed above, the switching loss of the FC boost converter 12 can not be sufficiently restrained, and hence it is preferable in terms of the efficiency of the fuel cell system 10 that the execution of the boost operation of the FC boost converter 12 is avoided to the greatest possible degree. This being the case, one example of the control of the FC boost converter 12 in order to accelerate the efficiency of the fuel cell system 10 will be described based on FIG. 11A. The control of the FC boost converter, which is shown in FIG. 11A, is executed by the ECU 20 when the motor 16 is supplied with the electric power generated by the fuel cell 11. Incidentally, it is, as described above, preferable that the boost operation in the semi-soft switching area RC3 is avoided to the greatest possible degree for attaining the much higher efficiency of the fuel cell system 10, however, the fuel cell system 10 according to the present invention does not completely exclude the boost operation but may utilize the boost operation as the necessity may arise.

To begin with, in S201, maximum torque enabling the motor 16 to generate the maximum output is calculated, which corresponds to the actual number of revolutions of the motor 16 that is detected by the encoder. To be specific, the ECU 20 has a map in which the number of revolutions of the motor 16 is associated the maximum torque corresponding thereto, and the maximum torque of the motor 16 is calculated in a way that accesses this map according to the detected number of revolutions. Upon an end of the process in S201, the operation proceeds to S202.

In S202, a request torque, of which the output is requested of the motor 16, is calculated based on the opening degree of the accelerator pedal, which is detected by the accelerator pedal sensor 21. If it is defined that a full opening degree of the accelerator pedal requests the maximum torque in the number of revolutions of the motor 16 at the present point of time, the request torque is calculated according to the following formula, where a coefficient when in the full opening degree is 100%, while the coefficient when in a full closing degree is 0%. Upon the end of the process in S202, the operation proceeds to S203.

(Request Torque)=(Maximum Torque)×(Coefficient Corresponding to Opening Degree of Accelerator Pedal)

In S203, the request output defined as the output requested of the motor 16 is calculated, based on the calculation results in S201 and S202, according to the following formula. Upon the end of the process in S203, the operation proceeds to S204.

(Request Output)=(Request Torque)×(Number of Revolutions of Motor)

In S204, a motor necessary voltage (Vmot) defined as the voltage that should be applied to the inverter 15 is calculated based on the request output calculated in S203 and the number of revolutions of the motor 16. Specifically, the ECU 20 has a motor necessary voltage map in which a function F generated by the number of revolutions (rpm) of the motor 16 and the request output (P) is associated with the motor necessary voltage, and the motor necessary voltage is calculated in a way that accesses this map according to the number of revolutions of the motor and the request output. The motor necessary voltage map can be previously determined from an experiment etc, and one example of this map is that the request voltage value should increase because the counter electromotive force (voltage) rises with the higher number of revolutions of the motor 16 and therefore also should increase in order to attain the output thereof with a less quantity of current when the request output rises, and hence these points are reflected in the correlation between the function F and the motor necessary voltage. Upon the end of the process in S204, the operation proceeds to S205. In S205, an output voltage (Vfc) of the fuel cell 11 generating the electricity is detected based on the opening degree of the accelerator pedal, which is detected by the accelerator pedal sensor 21. This detection is conducted via an unillustrated voltagesensor. Upon the end of the process in S205, the operation proceeds to S206. In S206, a temporary boost ratio Rt (=Vmot/Vfc) is calculated by dividing the motor necessary voltage calculated in S204 by the output voltage of the fuel cell 11 that is detected in S205. Upon the end of the process in S206, the operation proceeds to S207.

In S207, it is determined whether the FC boast converter 12 can be stopped or not. Namely, it is determined which area, RC1 or RC1, to which the operation area of the FC boost converter 12 belongs. To be specific, if the temporary boost ratio calculated in S206 is less than 1 and if the output voltage of the fuel cell 11 is between Vfcmax and Vfcb, the operation area of the FC boost converter 12 is determined to be RC1; and, if the output voltage of the FC boost converter 12 is equal to or smaller than Vfcb and if the outlet port voltage of the FC boost converter 12 is equal to or smaller than the voltage taking the same value as Vfcb, the operation area of the FC boost converter 12 is determined to be RC2. Note that the values of Vfcb and Vfcmax may be determined beforehand according to the actual specifications of the fuel cell 11 and the battery 13. Moreover, the outlet port voltage of the FC boost converter 12 is detected via an unillustrated voltage sensor.

Then, if determined to be affirmative in S207, the operation proceeds to S208, in which the FC boost converter 12 is stopped, and the output voltage from the fuel cell 11 is applied directly to the inverter 15. With this contrivance, the switching loss in the FC boost converter 12 can be restrained. Note that as described above, if the operation area of the FC boost converter 12 belongs to RC1, the voltage can be applied to the inverter 15 from the battery after being boosted, however, if the operation area belongs to RC2, the terminal voltage of the fuel cell 11 is controlled down to the lowest voltage controllable by the battery boost converter 14. Whereas if determined to be negative in S207, the operation proceeds to S209.

In S209, it is determined whether the temporary boost ratio Rt calculated in S206 exceeds 2 or not. Namely, it is determined which area, the soft switching area RC4 or the semi-soft switching area RC3, the operation area of the FC boost converter 12 is positioned in. If determined to be affirmative in S209, this implies that the operation area of the FC boost converter 12 exists in the soft switching area RC4, the operation proceeds to S210, in which the soft switching process shown in FIG. 3 is executed so that the target output voltage of the FC boost converter 12 becomes the motor necessary voltage Vmot. Incidentally, the duty ratio of the switching element S1 is determined based on the temporary boost ratio Rt. Whereas if determined to be negative in S209, this implies that the operation area of the FC boost converter 12 exists in the semi-soft switching area RC3. Then, in this case, the operation proceeds to S211.

In S211, in the fuel cell system 10, in addition to the voltage boost based on the temporary boost ratio Rt calculated in S206, it is determined whether or not a further additional voltage boost (which will hereinafter be simply termed the [additional voltage boost]) is permitted. In other words, the negative determination in S209 connotes that the operation area of the FC boost converter 12 exists in the semi-soft switching area RC3 at the present point of time, and hence it is determined whether or not the operation area can transition to the soft switching area RC4. Namely, when performing the additional voltage boost for making the operation area transition to the soft switching area RC4 from the semi-soft switching area RC3, the voltage applied to the inverter 15 gets higher than the motor necessary voltage. As a result, though the switching loss in the inverter 15 increases, when the decrement of the switching loss of the FC boost converter 12 is compared with the increment of the switching loss of the inverter 15, there might be a case where the former decrement is larger, in which case this additional voltage boost is extremely useful in terms of the system efficiency. Then, it is determined in S211 whether the additional voltage boost is permitted or not. If determined to be affirmative in S211, the operation proceeds to S212, in which an additional boost ratio Ra for the additional voltage boost is determined. This additional boost ratio Ra is an additional boost ratio needed for getting the final boost ratio (given by Rt×Ra) of the FC boost converter 12 to exceed the boost ratio (e.g., the boost ratio "2") determined by the rectilinear line LR2. Then, after the process in S212, the operation proceeds to S213, in which the soft switching process shown in FIG. 3 is executed so that the target output voltage of the FC boost converter 12 becomes the voltage calculated by multiplying the output voltage Vfc of the fuel cell 11 by the boost ratio Rt and the additional boost ratio Ra. Note that the duty ratio of the switching element S1 is determined based on a product of the temporary boost ratio Rt and the additional boost ratio Ra.

Thus, at the point of time when determined to be negative in S209, the operation area of the FC boost converter 12 is originally the semi-soft switching area RC3, and, even when executing the soft switching process in that state, as described above, it is difficult to sufficiently restrain the switching loss. In this case, the boost ratio of the FC boost converter 12 takes account of the additional boost ratio Ra, whereby the operation area of the FC boost converter 12 is set to the soft switching area RC4 by further increasing the voltage over the voltage originally needed for actuating the motor 16. As a result, the switching loss can be effectively restrained.

Whereas if determined to be negative in S211, the operation proceeds to S214, in which the soft switching process is executed in the state where the operation area of the FC boost converter 12 is RC3. When the fuel cell 11 is in the state that does not permit the additional voltage boost, i.e., in the state where the switching loss in the inverter 15 becomes remarkable by additionally boosting the voltage as described above, the processes in S212 and S213 are not executed.

According to the FC boost converter control shown in FIG. 11A, the boost operation of the FC boost converter 12 can be stopped to the greatest possible degree on the premise that the actuation of the motor 16 is ensured, whereby the switching loss can be restrained. Further, even in the case of performing the boost operation of the FC boost converter 12, the soft switching process is executed after setting the operation area to the soft switching area RC4 as much as possible, and therefore the switching loss of the FC boost converter 12 can be restrained to the greatest possible degree.

Second Working Example

Figure 11B:
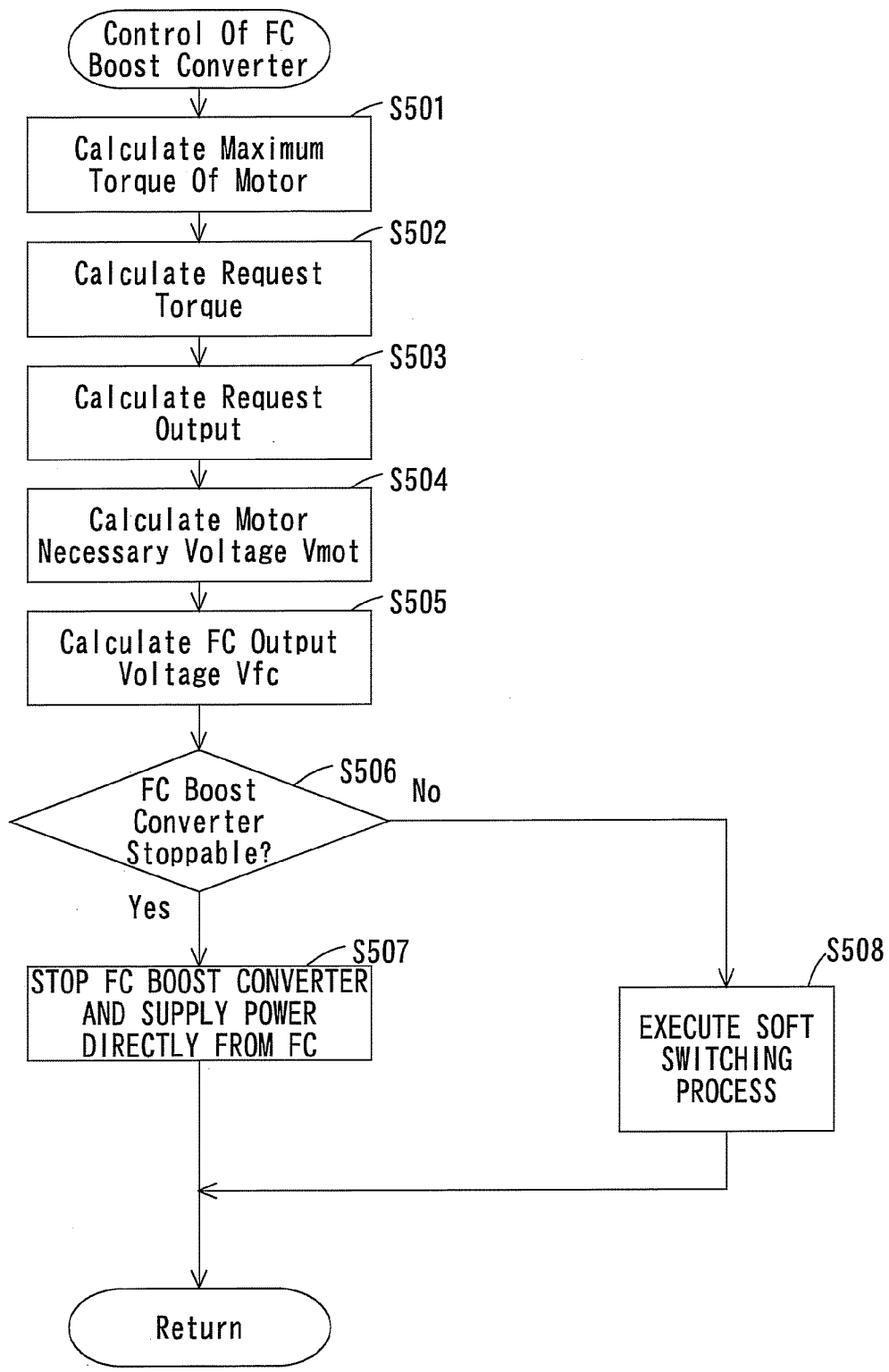
FIG. 11B A flowchart illustrating the flow of control conducted by the FC boost converter for accelerating efficiency of the fuel cell system according to the working example of the present invention.

A second working example of the fuel cell system 10 according to the present invention will be discussed. One example of how the FC boost converter 12 is controlled in order to enhance the efficiency of the fuel cell system 10 will be described based on FIG. 11B. The FC boost converter control shown in FIG. 11B is executed when the ECU 20 supplies the motor 16 with the electric power generated by the fuel cell 11. Processes S501-S504 in the FC boost converter control shown in FIG. 11B are the same as the processes S201-S204 in the FC boost converter control shown in FIG. 11A, and hence their descriptions are herein omitted. When a process in the process S504 in the FC boost converter control shown in FIG. 11B is terminated, the operation proceeds to S505.

In S505, the output voltage of the fuel cell 11 is calculated based on the output of the fuel cell 11 (which will hereinafter be simply referred to as the FC output). The FC output is calculated according to the formula (1) that is given below.

(FC Output)=(Request Output)+(Auxiliary Machinery Request Output)+(Battery Charge (Discharge) Output)  (1)

The request output is an output requested of the motor 16 and is the electric power needed for actuating the motor 16. The auxiliary machinery request output is the output requested of the auxiliary machinery such as the hydrogen tank 17 and the compressor 18 and is the electric power required for actuating the auxiliary machinery. The battery charge (discharge) output is the output required for charging/discharging the battery 13, the battery charge output is the electric power charged into the battery 13 when charged with the electricity, and the battery discharge output is the electric power discharged from the battery 13 when discharged. A difference between a residual electricity quantity of the battery 13 and the SOC threshold value is the battery charge (discharge) output.

If the residual electricity quantity of the battery 13 is less than the SOC threshold value, the FC output is calculated by including the battery charge output into the formula (1). If the residual electricity quantity of the battery 13 is equal to or larger than the SOC threshold value, the FC output is calculated by including the battery discharge output as a minus quantity into the formula (1). Then, the output voltage of the fuel cell 11 is calculated based on the FC output calculated in the formula (1) given above. To be specific, the ECU 20 has the IP characteristic map in which the FC output is associated with the output current of the fuel cell 11 and the IV characteristic map in which the output current of the fuel cell 11 is associated with the output voltage of the fuel cell 11, and the output voltage of the fuel cell 11 is calculated in a way that accesses these maps according to the FC output. According to the second working example, the FC output is calculated by taking account of the output requested of the auxiliary machinery and the charger/discharge output of the battery 13, thereby enabling the output voltage of the fuel cell 11 to be calculated by taking into consideration of the output requested of the auxiliary machinery and the residual electricity quantity of the battery 13. Incidentally, though not shown, if another power supply source supplies the auxiliary machinery with the output requested of the auxiliary machinery, the FC output may also be calculated without including the output requested of the auxiliary machinery into the formula (1) given above.

Further, the formula (1) may be transformed into the formula (2) as follows.

(FC Output)=(Request Output)+(Auxiliary Machinery Request Output)+(Battery Charge (Discharge) Output)+(Switching Loss of FC Boost Converter 12)+(Switching Loss of Battery Boost Converter 14)     (2)

With this transformation, the FC output is calculated in a way that takes account of the switching loss of the FC boost converter 12 and the switching loss of the battery boost converter 14, whereby the output voltage of the fuel cell 11 can be calculated by taking into consideration an amount of the switching loss of the FC boost converter 12 and an amount of the switching loss of the battery boost converter 14. The switching loss of the FC boost converter 12 connotes an amount of loss of the electric power supplied to the inverter 15, which is caused by switching of the FC boost converter 12. Further, the switching loss of the battery boost converter 14 connotes an amount of loss of the electric power supplied to the inverter 15, which is caused by switching of the battery boost converter 14. With this transformation, the FC output is calculated in a way that takes account of the switching loss of the FC boost converter 12 and the switching loss of the battery boost converter 14, whereby the output voltage of the fuel cell 11 can be calculated by taking into consideration the amount of the switching loss of the FC boost converter 12 and the amount of the switching loss of the battery boost converter 14. Note that as discussed above, if another power supply source supplies the auxiliary machinery with the output requested of the auxiliary machinery, the FC output may also be calculated without including the output requested of the auxiliary machinery into the formula (2) given above.

The calculation of the switching loss of the FC boost converter 12 involves providing the current sensor and the voltage sensor at the inlet port and the outlet port of the FC boost converter 12 and measuring the current and the voltage on the sides of the inlet/outlet ports of the FC boost converter 12. Further, the calculation of the switching loss of the battery boost converter 14 involves providing the current sensor and the voltage sensor at the inlet port and the outlet port of the battery boost converter 14 and measuring the current and the voltage on the sides of the inlet/outlet ports of the battery boost converter 14. Herein, if both of the FC boost converter 12 and the battery boost converter 14 perform the boost operation, the FC output is calculated in a way that takes account of the switching loss of the FC boost converter 12 and the switching loss of the battery boost converter 14. On the other hand, if only the battery boost converter 14 performs the boost operation, the FC output is calculated in a way that takes account of the switching loss of only the battery boost converter 14. Namely, the FC output is calculated by including the switching loss of the FC boost converter 12 and the switching loss of the battery boost converter 14 into the formula (2) given above.

On the other hand, if only the battery boost converter 14 performs the boost operation, the FC output is calculated by taking account of only the switching loss of the battery boost converter 14. To be specific, the FC output is calculated by including not the switching loss of the FC boost converter 12 but the switching loss of the battery boost converter 14 into the formula (2) given above. Moreover, if only the FC boost converter 12 performs the boost operation, the FC output is calculated by taking account of only the switching loss of the FC boost converter 12. Specifically, the FC output is calculated by including not the switching loss of the battery boost converter 14 but the switching loss of the FC boost converter 12 into the formula (2) given above. Furthermore, the FC output may also be calculated without including the battery charge (discharge) output into the formula (2) given above. This is because there is a case in which the battery charge (discharge) output may not be taken into consideration.

Upon finishing the process in S505, the operation advances to S506. In S506, it is determined whether the FC boost converter 12 can be stopped or not. To be specific, the motor necessary voltage calculated in S504 is compared with the output voltage of the fuel cell 11 that is calculated in S505, and it is determined whether or not the output voltage of the fuel cell 11 that is calculated in S505 is larger than the motor necessary voltage calculated in S504. Then, if determined to be affirmative in S506, i.e., if the output voltage of the fuel cell 11 that is calculated in S505 is larger than the motor necessary voltage calculated in S504, the operation proceeds to S507, in which the FC boost converter 12 is stopped, and the output voltage given from the fuel cell 11 is applied directly to the inverter 15. This operation enables the switching loss of the FC boost converter 12 to be restrained. Whereas if determined to be negative in S506, the operation advances to S508, in which the soft switching process shown in FIG. 3 is executed.

Further, if determined to be negative in the process S506 of the FC boost converter control shown in FIG. 11B, the temporary boost ratio Rt may also be calculated by dividing the motor necessary voltage calculated in S504 over the output voltage of the fuel cell 11 that is calculated in S505. Then, after calculating the temporary boost ratio Rt, the processes S209-S214 of the FC boost converter control shown in FIG. 11A may also be executed.

First Modified Example

Moreover, it is preferable that the converting efficiency of the inverter 15 and the efficiency of actuating the motor 16 are taken into consideration with respect to applying the voltage to the inverter 15 for actuating the motor 16. For example, as explained in the first working example and the second working example given above, when supplying the power to the motor 16 from the fuel cell 11, the FC boost converter 12 is not sopped, in which case the voltage applied to the inverter 15 is boosted by the FC boost converter 12. In the first modified example, the voltage applied to the inverter is determined from a map in which the efficiency characteristic of the loads including the inverter 15 and the motor 16 is associated with the voltage applied to the inverter 15 on the basis of the request torque and the number of revolutions of the motor 16. Then, with the boost operation of the FC boost converter 12, the output voltage of the fuel cell 11 is boosted up to the thus-determined voltage and applied to the inverter 15. For instance, the efficiency characteristic of the inverter 15 is conversion efficiency of the inverter 15 with respect to the voltage applied to the inverter 15, while the efficiency characteristic of the motor 16 is actuation efficiency of the motor 16 with respect to the voltage applied to the motor 16.

Figure 12A:
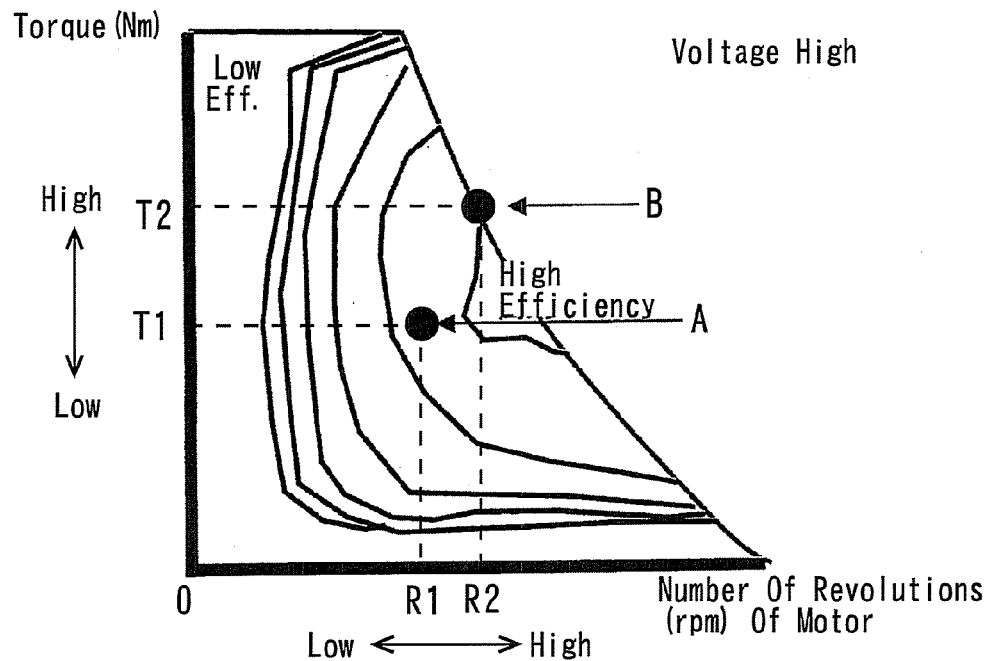
FIG. 12A A map displaying an area of an efficiency characteristic of the load in a case where the voltage applied to an inverter is high in the fuel cell system according to the working example of the present invention.
Figure 12B:
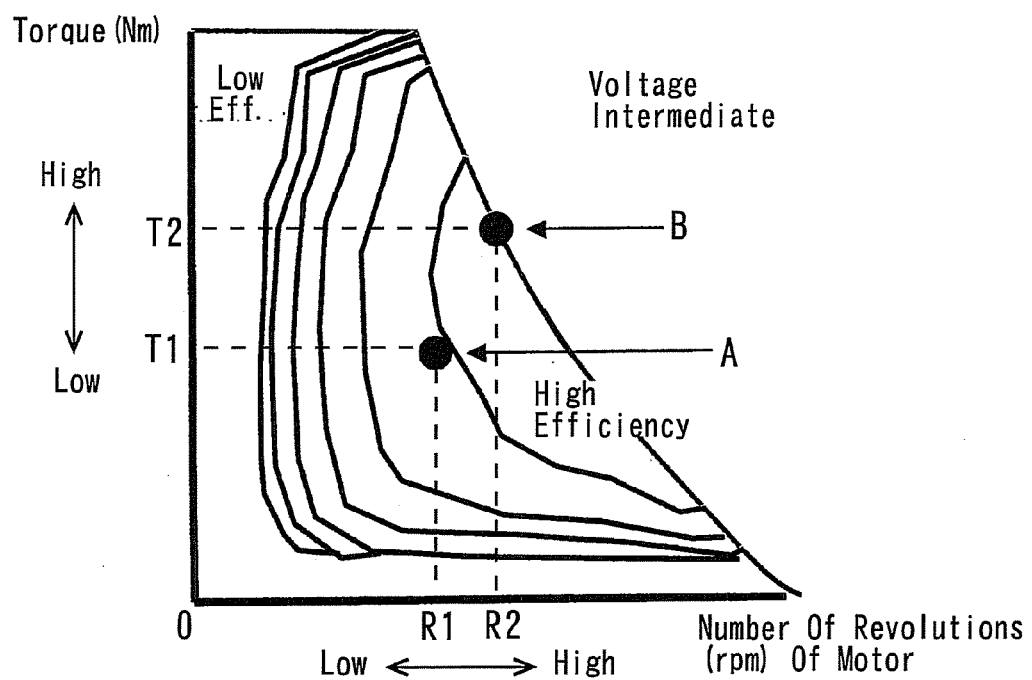
FIG. 12B A map displaying the area of the efficiency characteristic of the load in a case where the voltage applied to the inverter is intermediate in the fuel cell system according to the working example of the present invention.
Figure 12C:
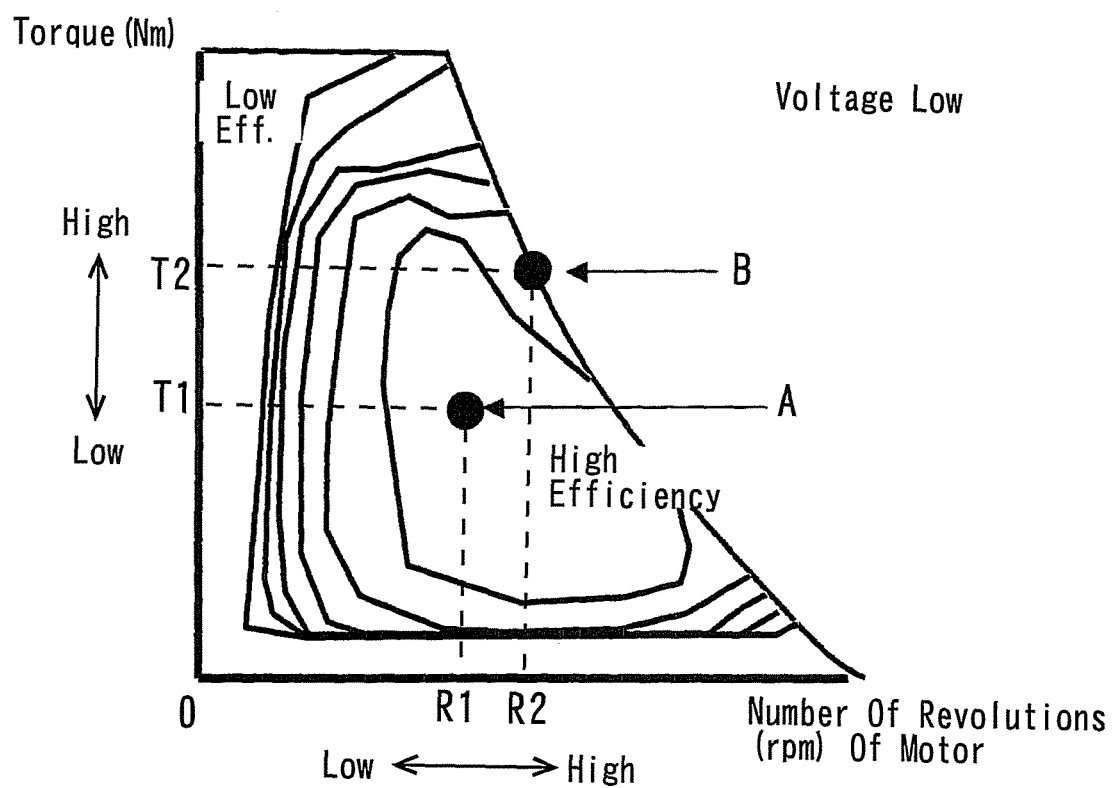
FIG. 12C A map displaying the area of the efficiency characteristic of the load in a case where the voltage applied to the inverter is low in the fuel cell system according to the working example of the present invention.

In the first modified example, the efficiency characteristic of the load is determined, and the area of the load efficiency characteristic as shown in FIGS. 12A, 12B and 12C is defined from the relation between the request torque and the number of revolutions of the motor 16. FIGS. 12A, 12B and 12C show maps in which the area of the load efficiency characteristic is divided stepwise according to an efficiency level, in which the request torque is given along the axis of ordinates, and the number of revolutions of the motor 16 is given along the axis of abscissa. FIG. 12A shows the map which displays the area of the load efficiency characteristic in the case where the voltage applied to the inverter 15 is high. FIG. 12B shows the map which displays the area of the load efficiency characteristic in the case where the voltage applied to the inverter 15 is intermediate. FIG. 12C shows the map which displays the area of the load efficiency characteristic in the case where the voltage applied to the inverter 15 is low. A point A in FIGS. 12A, 12B and 12C is determined based on the request torque T1 and the number-of-revolutions R1 of the motor (which will hereinafter be simply termed the [number-of-revolutions R1]), and a point B is determined based on the request torque T2 and the number-of-revolutions R2 of the motor 16 (which will hereinafter be simply termed the [number-of-revolutions R2]).

The point A in FIG. 12C is included in the area exhibiting the high efficiency of the load efficiency characteristic, however, the points A in FIGS. 12A and 12B are excluded from the area exhibiting the high efficiency of the load efficiency characteristic. Accordingly, in the request torque T1 and the number-of-revolutions R1, if the voltage applied to the inverter 15 is low, it is understood that the load efficiency characteristic is high. The point B in FIG. 12B is included in the area exhibiting the high efficiency of the load efficiency characteristic, however, the points B in FIGS. 12A and 12C are excluded from the area exhibiting the high efficiency of the load efficiency characteristic. Therefore, in the request torque T2 and the number-of-revolutions R2, if the voltage applied to the inverter 15 is intermediate, it is understood that the load efficiency characteristic is high. Thus, the load efficiency characteristic changes depending on the voltage applied to the inverter 15. Namely, a correlation is established between the voltage applied to the inverter 15 and the load efficiency characteristic.

Figure 12D:
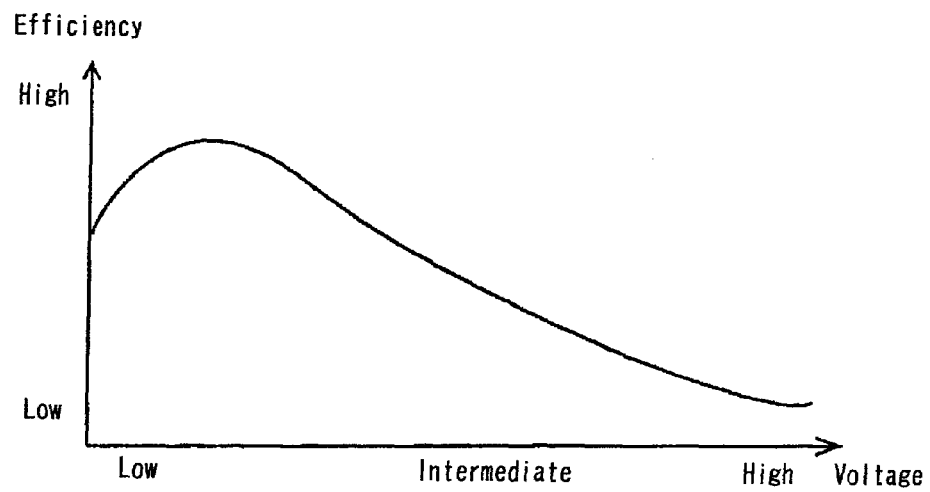
FIG. 12D A diagram showing a correlation between a voltage applied to an inverter and an efficiency characteristic of a load according to the working example of the present invention.

FIG. 12D shows the correlation between the voltage applied to the inverter 15 and the load efficiency characteristic with respect to the point A determined based on the request torque T1 and the number-of-revolutions R1. The axis of abscissa in FIG. 12D represents the voltage applied to the inverter 15, while the axis of ordinate I FIG. 12D represents the load efficiency characteristic. As illustrated in FIG. 12D, if the voltage applied to the inverter 15 is low, the load efficiency characteristic is higher than the cases where the voltage applied to the inverter 15 is intermediate and high. Accordingly, for ensuring to the greatest possible degree the actuation of the motor 16 in the request torque T1 and the number-of-revolutions R1, it may be sufficient that the FC boost converter 12 performs the boost operation so that the voltage applied to the inverter 15 becomes low.

Figure 12E:
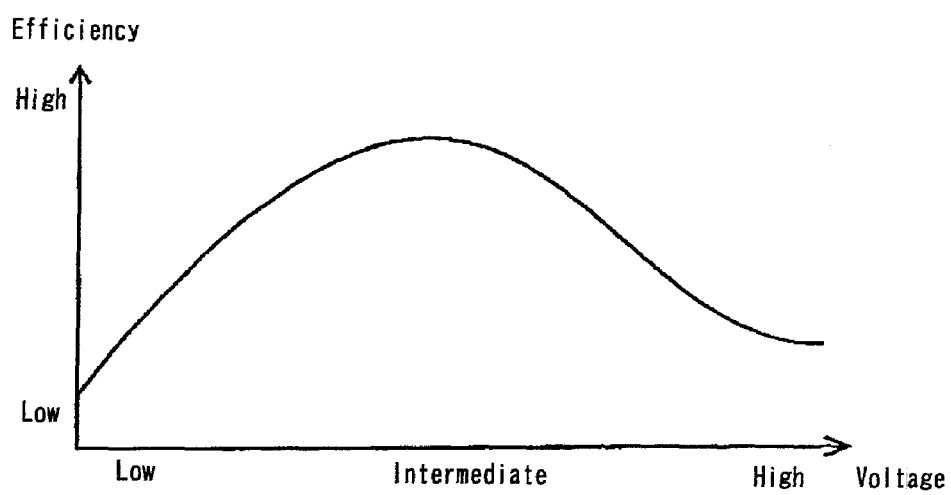
FIG. 12E A diagram showing the correlation between the voltage applied to the inverter and the efficiency characteristic of the load according to the working example of the present invention.

FIG. 12E shows the correlation between the voltage applied to the inverter 15 and the load efficiency characteristic with respect to the point B determined based on the request torque T2 and the number-of-revolutions R2. The axis of abscissa in FIG. 12E represents the voltage applied to the inverter 15, while the axis of ordinate I FIG. 12E represents the load efficiency characteristic. As illustrated in FIG. 12E, if the voltage applied to the inverter 15 is intermediate, the load efficiency characteristic is higher than the cases where the voltage applied to the inverter 15 is low and high. Accordingly, for ensuring to the greatest possible degree the actuation of the motor 16 in the request torque T2 and the number-of-revolutions R2, it may be sufficient that the FC boost converter 12 performs the boost operation so that the voltage applied to the inverter 15 gets intermediate.

In the fuel cell system 10 according to the first modified example, the ECU 20 has the map described above, and the voltage applied to the inverter 15 is determined in terms of the load efficiency characteristic. Then, the FC boost converter 12 conducts the boost operation so as to attain the thus-determined voltage, thereby enabling the optimal voltage to be applied to the inverter 15.

Second Modified Example

Moreover, as discussed above, the fuel cell system 10 can adopt the buck-boost (step-down/step-up) converter capable of performing the boost operation and the buck operation in place of the boost type battery boost converter 14. This being the case, in the second modified example, the FC output is calculated by including, into the formula (2) given above, the switching loss of the buck-boost converter capable of performing the boost operation and the buck operation (which will hereinafter be referred to as a battery buck-boost converter) as the substitute for the switching loss of the battery boost converter 14. The switching loss of the battery buck-boost converter connotes an amount of loss of the electric power supplied to the inverter 15, which is caused by the switching of the battery buck-boost converter. With this contrivance, it is feasible to calculate the output voltage of the fuel cell 11 by taking account of the amount of switching loss of the FC boost converter 12 and the amount of switching loss of the battery buck-boost converter.

Note that when the FC boost converter 12 performs the boost operation and the battery buck-boost converter conducts the buck-boost operation, the FC output is calculated by taking account of the switching loss of the FC boost converter 12 and the switching loss of the battery buck-boost converter. To be specific, the FC output is calculated by including the switching loss of the FC boost converter 12 and the switching loss of the battery buck-boost converter into the formula (2) given above. On the other hand, when only the battery buck-boost converter conducts the buck-boost operation, the FC output is calculated by taking account of only the switching loss of the battery buck-boost converter. Specifically, the FC output is calculated by including not the switching loss of the FC boost converter 12 but the switching loss of the battery buck-boost converter into the formula (2) given above. Further, when only the FC boost converter 12 performs the boost operation, the FC output is calculated by taking account of only the switching loss of the FC boost converter 12. To be specific, the FC output is calculated by including not the switching loss of the FC boost converter 12 but the switching loss of the battery buck-boost converter into the formula (2) given above.

Third Working Example

A third working example of the fuel cell system according to the present invention will hereinafter be described based on FIGS. 13 through 15. A different point of the fuel cell system according to the third working example from the fuel cell system according to the first working example is the auxiliary circuit 12b in the FC boost converter 12 and a technology related to this circuit 12b. Such being the case, the discussion on the third working example will be made in a way that focuses on the different point.

Figure 13:
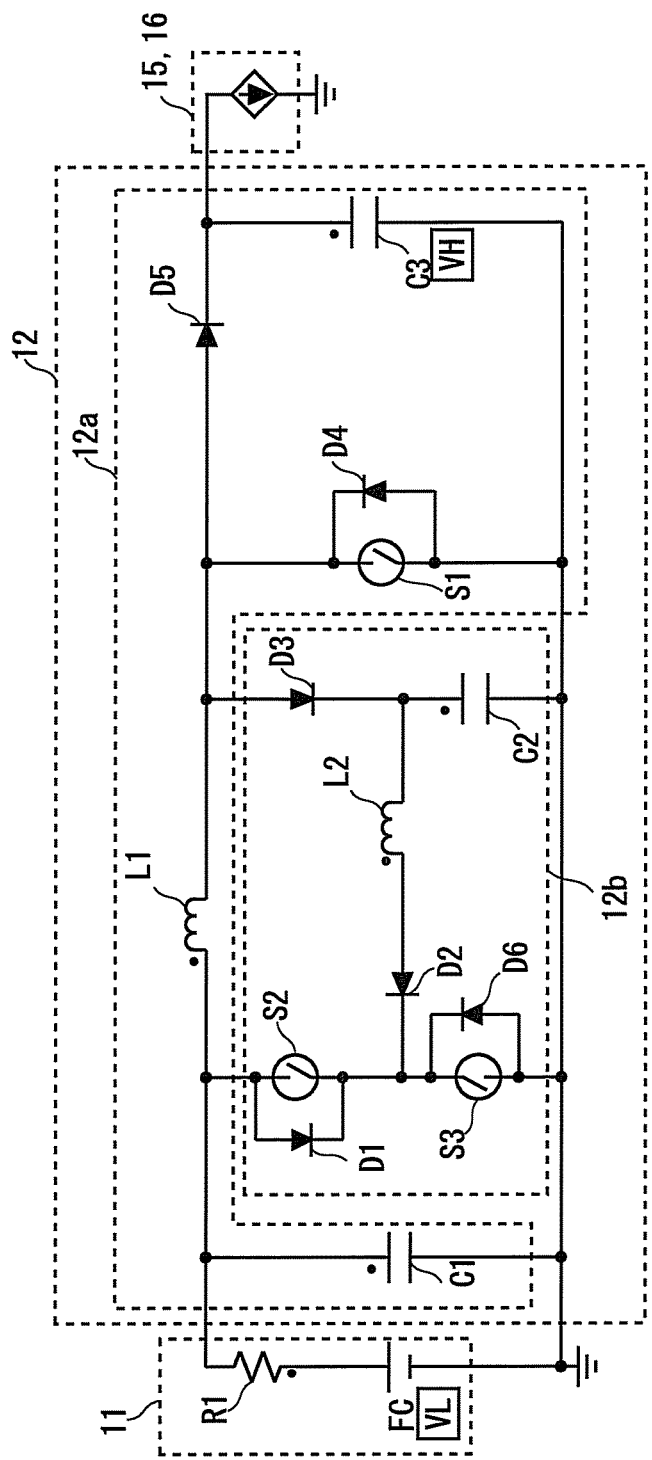
FIG. 13 A second diagram illustrating the configuration of the electric circuit of the fuel cell system shown in FIG. 1, illustrating particularly the configuration of the electric circuit of the FC boost converter.

FIG. 13 is, similarly to FIG. 2, a diagram illustrating an electric configuration of the fuel cell system 10 by placing the focus on the FC boost converter 12. Herein, the auxiliary circuit 12b of the FC boost converter 12 shown in FIG. 13 is further provided with a switching circuit constructed of a switching element S4 and the diode D6. Specifically, one end of the switching element S3 is connected to the anode terminal of the diode D2, and the other end of the switching element S3 is connected to the terminal, on the low potential side, of the fuel cell 11. This switching element S3 supports the discharge of the electric charge accumulated in the snubber capacitor C2 in the operation of the mode 2 in the previous soft switching process. This being the case, the third working example will discuss a new soft switching process including the switching operation of the switching element S3 with reference to FIGS. 14 and 15.

Figure 14:
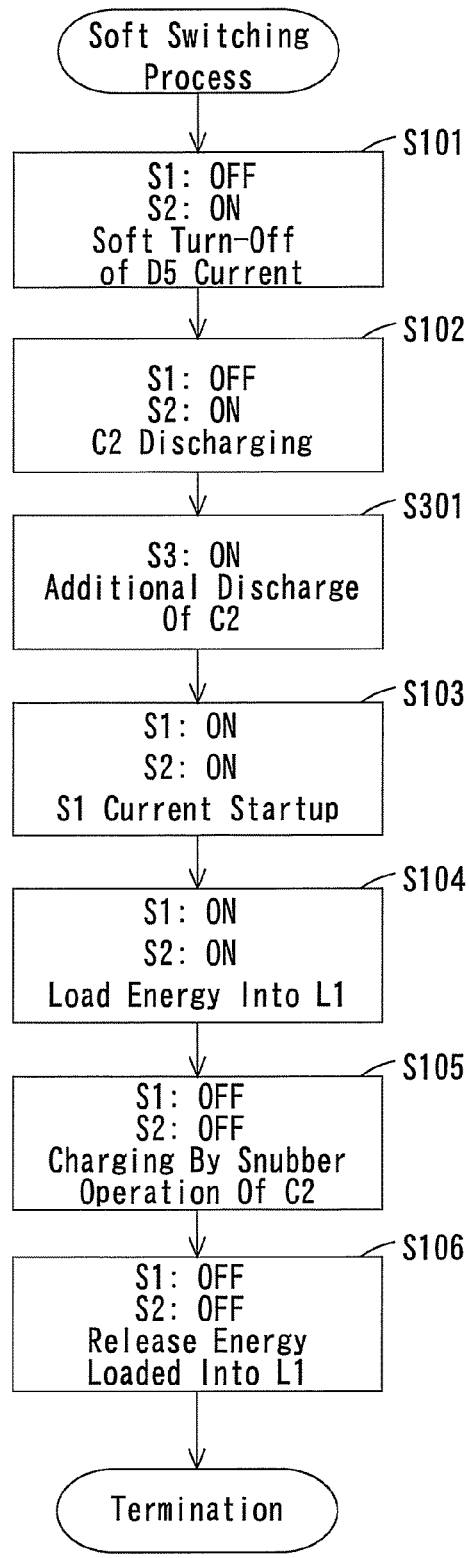
FIG. 14 A flowchart illustrating a flow of the soft switching process for boosting the voltage, which is conducted by the FC boost converter shown in FIG. 13.
Figure 15:
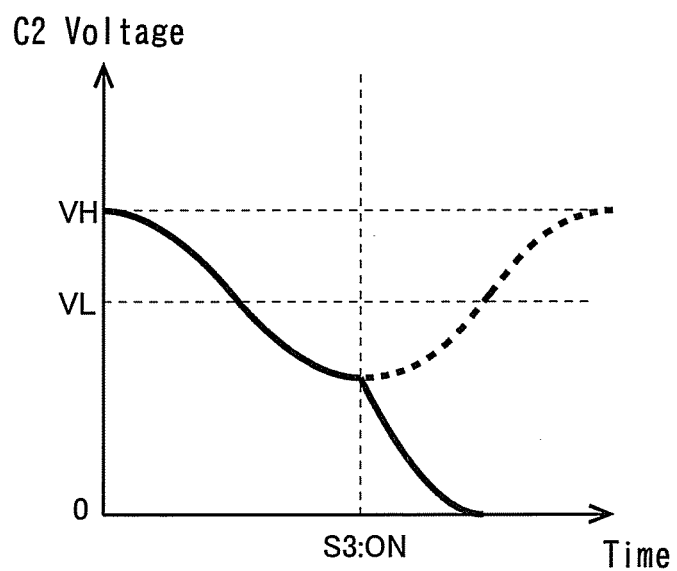
FIG. 15 A diagram illustrating the correlation between the ratio VH/VL between the outlet port voltage of the FC boost converter according to the working example of the present invention and the inlet port voltage thereof and the residual voltage in the snubber capacitor when discharged in the case of performing the operation of the mode 2 of the soft switching process shown in FIG. 14.

FIG. 14 is, similarly to FIG. 3, a flowchart illustrating a flow of the soft switching process in the FC boost converter 12. A difference from the soft switching process shown in FIG. 3 is such a point that a new process in S301 according to the switching operation of the switching element S3 is inserted in between the processes in S102 and S103, i.e., between the respective operations of the mode 2 and the mode 3. Then, this different point will be described emphatically, while the detailed description of other processes is omitted in a way that marks these processes with the same reference numerals and symbols as those in FIG. 3.

Herein, when the operation of the mode 2 is conducted in the process of S102, in the FC boost converter 12, the switching element S3 is in the turn-OFF state. Further, for clearly showing an effect of the switching operation of the switching element S3, in the relation between the outlet port voltage VH and the inlet port voltage VL of the FC boost converter 12, the ratio VH/VL defined as a parameter representing the electrical state of the FC boost converter 12 is set less than 2. In this case, the electric charge in the snubber capacitor C2 is released due to the half-wave resonance between the coil L2 and the snubber capacitor C2, however, as illustrated in FIG. 10B, it follows that the voltage of the snubber capacitor C2 does not become zero.

Herein, in the third working example, the switching element S3 is turned ON in the process of S301 at timing when the fluctuation in voltage of the snubber capacitor C2 due to the half-wave resonance reaches a bottom value. Then, as shown in FIG. 15, the electric charge, which is not completely released due to the half-wave resonance in the snubber capacitor C2, gets dispersed into the auxiliary circuit 12b via the switching element S3, and consequently the voltage of the snubber capacitor C2 can be further reduced. As a result, in the process of S103 after S301, when the switching element S1 is turned ON, the voltage applied to the switching element S1 can be decreased to the greatest possible degree, whereby the switching loss can be surely restrained. Note that in the relation between the outlet port voltage VH and the inlet port voltage VL of the FC boost converter 12, if the ratio VH/VL exceeds the predetermined value (if over 2 in the third working example), the electric charge of the snubber capacitor C2 is completely released owing to the operation of the mode 2, and hence the process of S301 is not necessarily required to be executed.

Fourth Working Example

Figure 16:
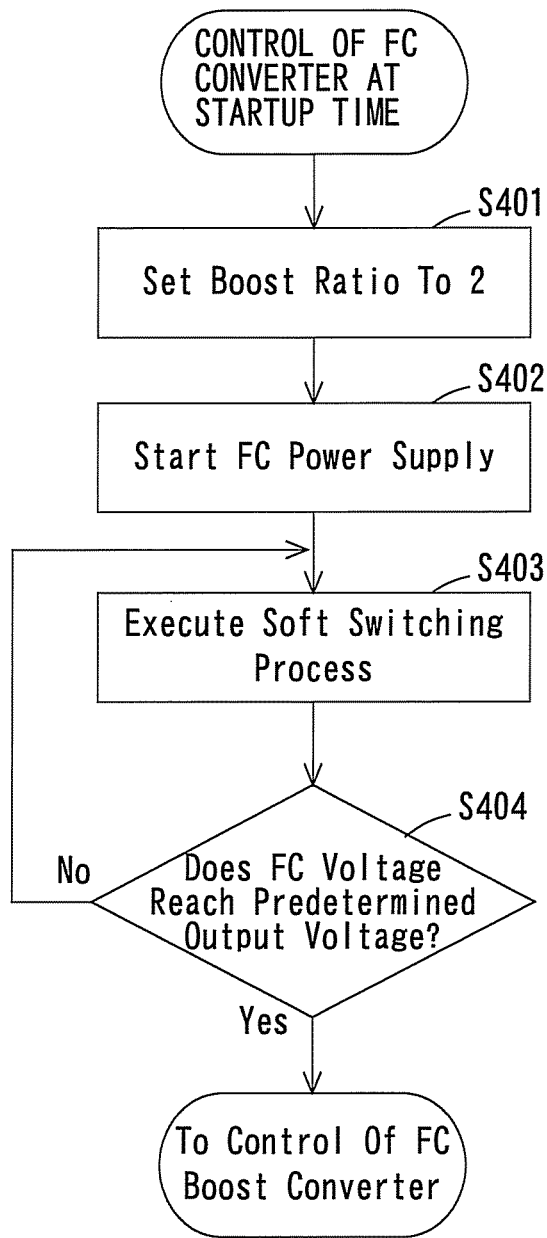
FIG. 16 A flowchart related to control of the FC boost converter 12 when the fuel cell system according to the working example of the present invention starts for supplying the electric power to the motor from a stopping state thereof.

A fourth working example of the fuel cell system according to the present invention will hereinafter be described based on FIG. 16. FIG. 16 is a flowchart as to how the FC boost converter 12 is controlled on such an occasion that the fuel cell system 10 is started up for supplying the electric power to the motor 16 from the stopped status thereof. Accordingly, the FC boost converter control at the startup time illustrated in FIG. 16 is the control executed by the ECU 20 before the FC boost converter control shown in FIG. 11 and can be also applied to the FC boost converter 12 disclosed in each of the working examples discussed so far.

To begin with, in S401, before the fuel cell 11 supplies the electric power to the motor 16, the boost ratio in the FC boost converter 12 is set to "2". Namely, when starting up the fuel cell 11, the boost ratio in the FC boost converter 12 is set to "2" irrespective of the operating status of the motor 16, whereby it follows that the operation area of the FC boost converter 12 is set in the soft switching area RC4. Thereafter, the fuel cell 11 starts supplying the electric power to the motor 16 in S402, and the soft switching process for the boost operation by the FC boost converter 12 is executed in S403.

Further, in S404, it is determined whether or not the output voltage of the fuel cell 11 reaches a predetermined output voltage needed for actuating the motor 16. If determined to be affirmative in S404, this implies that the startup process of the fuel cell 11 is finished, and hence thereafter it follows that the FC boost converter control for actuating the motor 16 is carried out. Whereas if determined to be negative in S404, this implies that the startup process of the fuel cell 11 is not finished, and therefore the processes from S403 onward are again repeated.

Thus, in the FC boost converter control at the startup time according to the fourth working example, during a period till the startup process of the fuel cell 11 is completed, the boost ratio in the FC boost converter 12 is set to "2" regardless of the operation status of the motor 16. Normally when starting up the fuel cell 11, because of there being no excess of the value of the ratio VH/VL over the predetermined threshold value (which is "2" in the case of the fourth working example), the switching element S1 can not be turned ON in the state of setting the snubber capacitor C2 to zero, and the reducing effect of the switching loss owing to the soft switching process can not be enjoyed. Such being the case, especially through the process in S401, when starting up the fuel cell 11, the operation area of the FC boost converter 12 is set in the soft switching area RC4 by forcibly setting the boost ratio to "2", thereby enabling the improvement of the efficiency to be attained when starting up the fuel cell system 10.

Other Working Examples

It should be noted that with respect to the circuit described above, at the soft switching time, in order for the regenerative power accumulated in the snubber capacitor C2 not to be inputted to the fuel cell 11, an element for restraining the regenerative power may be provided on the circuit of the electricity flowing to the fuel cell 11 from the snubber capacitor C2, or alternatively the regenerative power accumulated in the snubber capacitor C2 may flow to the battery 13. A method of restraining the regenerative power flowing to the fuel cell 11 involves, e.g., providing, it is considered, the smoothing capacity, the Zener diode or the varistor, of which one end is earthed, on the electric path via which the electricity flows to the fuel cell 11 from the snubber capacitor C2, whereby the voltage of the electric path can be restrained from becoming equal to or larger than the specified voltage. Further, a useful method is a method of providing the diode for preventing a backflow of the regenerative power to the fuel cell 11 from the snubber capacitor C2. Then, for example, a method of taking a circuit configuration of connecting the downstream side of the switching element S2 to nit the fuel cell 11 but the battery 13 is exemplified as the method of making the regenerative power flow to the battery 13.

Further, as explained in the foregoing embodiment, when the load including the inverter 15 and the motor 16 is supplied with the electric power via the FC boost converter 12 from the fuel cell 11, the power loss occurs in the FC boost converter 12. This power loss includes a core loss or the switching loss, which has a small degree of dependence on the magnitude of the electric power to be converted. Therefore, especially a decrease in power efficiency becomes conspicuous in the low-load area showing the small output power. Then, in the low-load area, there is a strong demand that the load should be supplied with the electric power of the fuel cell 11 without converting the electric power (a through mode, a bypass mode) by stopping the FC boost converter 12 or the load should be supplied with the electric power via the battery boost converter 14 from the battery 13.

Figure 17A:
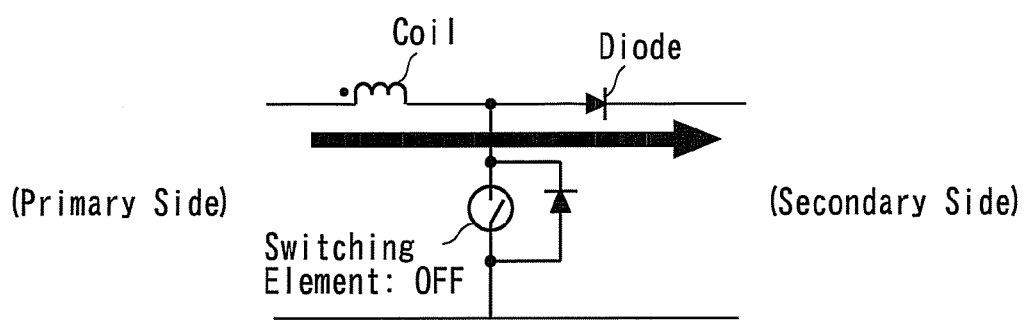
FIG. 17A A first diagram schematically showing a through mode in the converter.
Figure 17B:
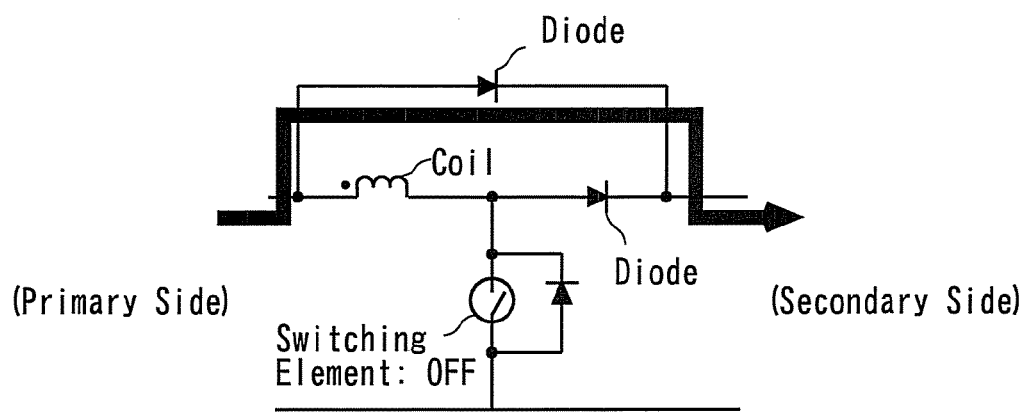
FIG. 17B A diagram schematically showing a bypass mode in the converter.
Figure 17C:
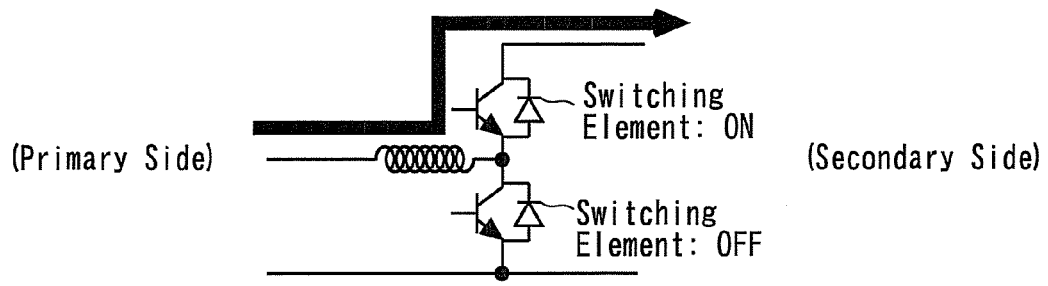
FIG. 17C A second diagram schematically showing the through mode in the converter.
Figure 17D:
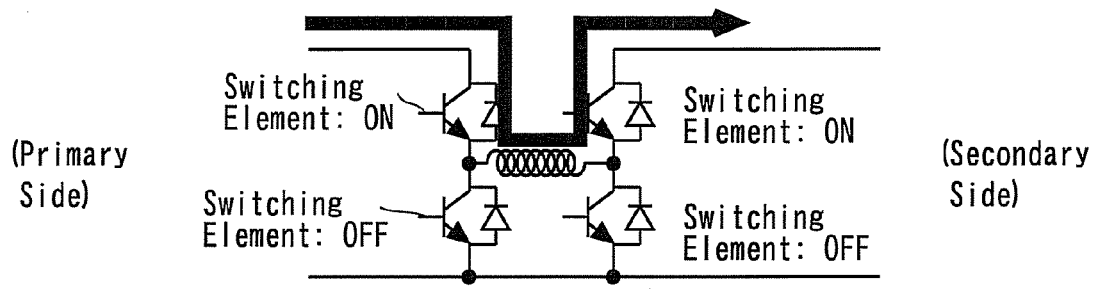
FIG. 17D A third diagram schematically showing the through mode in the converter.

Herein, the through mode and the bypass mode in the general type of converter will be briefly described based on FIGS. 17A-17D. Note that an arrowhead of a bold line in FIGS. 17A-17D represents a flow of the current in each converter. FIG. 17A is a diagram showing how the through mode is when the converter is the boost type converter (the FC boost converter 12 described above corresponds to this type of converter). The voltage on the primary side can be applied as it is to the secondary side by setting the switching element for boosting in the turn-OFF state. FIG. 17B is a diagram showing how the bypass mode is when the converter is the boost type converter, in which a diode for bypass is connected in parallel to a series module constructed of a coil for boosting and a diode. The voltage on the primary side is bypassed and thus can be applied to the secondary side by setting the switching element for boosting in the turn-OFF state. FIG. 17C is a diagram showing how the through mode is when the converter is a half-bridge type converter. In the two switching elements for boosting, the switching element on the upper side in FIG. 17C is set in the turn-ON state, while the switching element on the lower side is set in the turn-OFF state, whereby the voltage on the primary side can be applied as it is to the secondary side. FIG. 17D is a diagram showing how the through mode is when the converter is a full-bridge type converter. In the four switching elements for boosting, the two switching elements on the upper side in FIG. 17D are set in the turn-ON state, while the two switching elements on the lower side are set in the turn-OFF state, whereby the voltage on the primary side can be applied as it is to the secondary side. The configuration illustrated in each of FIGS. 17B-17D is different from the FC boost converter 12 described above, however, supposing that the FC boost converter 12 adopts these configurations, the through mode and the bypass mode can be realized by controlling the switching elements illustrated in these drawings.

On the other hand, the fuel cell 11 is required to avoid a sintering phenomenon of the catalyst for improving the durability. The sintering phenomenon is a phenomenon that a Pt catalyst on the electrode of the fuel cell 11 is said to be agglutinated and induced by oxidation-reduction reaction to water (and protons) on the surface of the Pt catalyst. Further, it is known that the oxidation-reduction reaction such as this is brought about at a comparatively high potential, in which the terminal voltage of the fuel cell 11 is in the vicinity of the open circuit voltage (OCV).

Incidentally, when the fuel cell 11 comes to have the low load, the terminal voltage of the fuel cell 11 gets close to the open circuit voltage (OCV) according to the IV characteristic of the fuel cell 11. As described above, however, when stopping the FC boost converter 12, the terminal voltage of the fuel cell 11 can not be controlled, and it is difficult to avoid the deterioration of the catalyst due to the oxidation-reduction reaction.

Then, in the case of stopping the FC boost converter 12, the terminal voltage of the fuel cell 11 may be controlled by controlling the voltage, on the output side, of the FC boost converter 12 by the battery boost converter 14 provided in parallel to the FC boost converter 12. Namely, the ECU 20 may monitor the terminal voltage of the fuel cell 11 and may control the output voltage of the battery boost converter 14 so that the terminal voltage of the fuel cell 11 is less than a reference value for avoiding the sintering phenomenon. This reference value may be set as, e.g., an experimental value or an empirical value.

Furthermore, if the terminal voltage of the battery 13 is high, if the request voltage of the inverter 15 is low and if the boost ratio of the battery boost converter 14 can not be set equal to or larger than 1, conversely the battery boost converter 14 must be stopped. In such a case, for avoiding the sintering phenomenon, the FC boost converter 12 may control the terminal voltage of the fuel cell 11 on the basis of the request voltage of the inverter 15 without stopping the FC boost converter 12.

In the case described above, anyway, it is required for controlling the terminal voltage of the fuel cell 11 under the reference value that the current be drawn from the fuel cell 11 and the electric power be consumed. The electric power in this case is consumed normally by the load including the inverter 15 and the motor 16. With respect to surplus power, however, in the state where the SOC of the battery 13 is low and the electric power can be accumulated in the battery 13, the power is accumulated in the battery 13, while the electric power unable to be accumulated in the battery 13 may be consumed by the auxiliary machinery (an air-conditioner, illuminations, a pump, etc).

Moreover, in the fuel cell system 10 also serves as a system for cutting off the output of the fuel cell 11 upon a collision of the vehicle 1. Specifically, a relay circuit for switching ON/OFF the electric connection with the inverter 15 and the battery boost converter 14 is provided on a downstream side of the FC boost converter 12 of the fuel cell system 10. Note that as obvious from the already-explained configuration, the fuel cell system 10 is contrived such that the quantity of the current flowing on the downstream side of the FC boost converter 12 is small. Therefore, the fuel cell system 10 is the system adopting a smaller size (a lower current) of relay circuit than the relay circuit provided just posterior to the fuel cell in the same type of existing system.

Then, the ECU 20 of the fuel cell system 10 is a unit which always monitors, based on an output of a collision detection sensor provided in the vehicle 1, whether the collision happens or not, and, in the event of detecting the collision, cuts off the electrical connection between the FC boost converter 12, the inverter 15 and the battery boost converter 14 by controlling the relay circuit.

What is claimed is:

1. A fuel cell system comprising:
    a drive motor serving as a power source for driving a load and driven by electric power;
    a fuel cell generating electricity with electrochemical reaction of an oxidation gas containing oxygen to a fuel gas containing hydrogen and supplying the electric power to said drive motor;
    a first boost device boosting a voltage output from said fuel cell and enabling the post-boosting voltage to be supplied to said drive motor;
    a secondary battery capable of charging and discharging of the electric power and supplying the electric power to said drive motor with the discharge;
    a second boost device boosting a voltage output from said secondary battery and enabling the post-boosting voltage to be supplied to said drive motor; and
    a boost control unit controlling the voltage boost by said first boost device on the basis of a correlation between an output voltage of said fuel cell and a motor voltage necessary for driving said drive motor,
    wherein said boost control unit calculates output electric power of said fuel cell when driving said drive motor on the basis of the electric power supplied to the drive motor necessary for driving said drive motor, the electric power in the charge and the discharge of said secondary battery, the electric power that is lost when said first boost device boosts the output voltage of said fuel cell and the electric power that is lost when said second boost device boosts the output voltage of said secondary battery, and calculates output voltage of said fuel cell from the calculated output electric power of said fuel cell, and
    wherein said boost control unit conducts a control of the voltage boost by said first boost device, which is as to whether said drive motor is driven by the output voltage of said fuel cell or by a post-boosting voltage given after boosting said output of said fuel cell, based on a result of comparison between said output voltage of said fuel cell and the motor voltage necessary for driving said drive motor, and
    wherein said boost control unit, when the output voltage of said fuel cell is higher than the motor voltage of said drive motor, inhibits the output voltage of said fuel cell from being boosted by said first boost device and thus supplies the output voltage of said fuel cell directly to said drive motor, and
    wherein said boost control unit, when the output voltage of said fuel cell is not higher than the motor voltage of said drive motor, supplies the post-boosting voltage given after boosting said output voltage of said fuel cell by the first boost device to said drive motor.

2. The fuel cell system according to claim 1, wherein said boost control means unit further controls the boost of the voltage by said first boost device on the basis of a correlation between a voltage applied to said drive motor and drive efficiency of said drive motor.

3. The fuel cell system according to claim 1, wherein said boost control unit further controls the boost of the voltage by said first boost device and the boost of the voltage by said second boost device on the basis of the correlation between the voltage applied to said drive motor and the drive efficiency of said drive motor.

4. A fuel cell system comprising:
    a drive motor serving as a power source for driving a load and driven by electric power;
    a fuel cell generating electricity with electrochemical reaction of an oxidation gas containing oxygen to a fuel gas containing hydrogen and supplying the electric power to said drive motor;
    a first boost device boosting a voltage output from said fuel cell and enabling the post-boosting voltage to be supplied to said drive motor;
    a secondary battery capable of charging and discharging of the electric power and supplying the electric power to said drive motor with the discharge;
    a buck-boost device stepping up and down a voltage output from said secondary battery and enabling the post-stepping-up-and-down voltage to be supplied to said drive motor; and
    a boost control unit controlling the voltage boost by said first boost device on the basis of a correlation between an output voltage of said fuel cell and a motor voltage necessary for driving said drive motor,
    wherein said boost control unit calculates output electric power of said fuel cell when driving said drive motor on the basis of the electric power supplied to the drive motor necessary for driving said drive motor, the electric power in the charge and the discharge of said secondary battery, the electric power that is lost when said first boost device boosts the output voltage of said fuel cell and the electric power that is lost when said buck-boost device steps up and down the output voltage of said secondary battery, and calculates output voltage of said fuel cell from the calculated output electric power of said fuel cell, and
    wherein said boost control unit conducts a control of the voltage boost by said first boost, which is as to whether said drive motor is driven by the output voltage of said fuel cell or by a post-boosting voltage given after boosting said output voltage of said fuel cell, based on a result of comparison between said output voltage of said fuel cell and the motor voltage necessary for driving said drive motor, and
    wherein said boost control unit, when the output voltage of said fuel cell is higher than the motor voltage of said drive motor, inhibits the output voltage of said fuel cell from being boosted by said first boost device and thus supplies the output voltage of said fuel cell directly to said drive motor, and
    wherein said boost control unit, when the output voltage of said fuel cell is not higher than the motor voltage of said drive motor, supplies the post-boosting voltage given after boosting said output voltage of said fuel cell by the first boost device to said drive motor.

5. The fuel cell system according to claim 4, wherein said boost control unit further controls the boost of the voltage by said first boost device and the step-up and the step-down of the voltage by said buck-boost device on the basis of the correlation between the voltage applied to said drive motor and the drive efficiency of said drive motor.

6. The fuel cell system according to claim 4, wherein said boost control unit further controls the boost of the voltage by said first boost device on the basis of a correlation between a voltage applied to said drive motor and drive efficiency of said drive motor.

7. A fuel cell system comprising:
a drive motor serving as a power source for driving a load and driven by electric power;
a fuel cell generating electricity with electrochemical reaction of an oxidation gas containing oxygen to a fuel gas containing hydrogen and supplying the electric power to said drive motor, an output voltage of said fuel cell being set so as to exceed a motor voltage necessary for driving said drive motor in a predetermined drive range defined as a partial area of all a drive range that can be taken by said drive motor, the predetermined drive range being the range in which a frequency of the user's request for driving the load is equal to or larger than a predetermined rate;
a first boost device boosting a voltage output from said fuel cell and enabling the post-boosting voltage to be supplied to said drive motor, the first boost device being able to control a terminal voltage of the fuel cell through the boost operation thereof; and
a boost control unit intermittently controlling the voltage boost by said first boost device on the basis of a correlation between an output voltage of said fuel cell and the motor voltage necessary for driving said drive motor when driving said drive motor,
wherein said boost control unit, when a drive state of said drive motor belongs to the predetermined drive range, restricts the output voltage of said fuel cell from being boosted by said first boost device and thus supplies the output voltage of said fuel cell directly to said drive motor.

8. The fuel cell system according to any one of claim 7, further comprising a secondary battery capable of charging and discharging of the electric power and supplying the electric power to said drive motor with the discharge, a maximum output voltage of said secondary battery being set so as to be lower than a maximum output voltage of said fuel cell in a second predetermined drive range defined as a partial area of the predetermined drive range; and
a second boost device boosting a voltage output from said secondary battery and enabling the post-boosting voltage to be supplied to said drive motor.

9. The fuel cell system according to claim 8, wherein said boost control device, when a drive state of said drive motor belongs to the second predetermined drive range, restricts the output voltage of said fuel cell from being boosted by said first boost device and thus supplies the output voltage of said fuel cell directly to said drive motor.

10. The fuel cell system according to claim 8, wherein said boost control device, when an input-side voltage of said first boost device in said fuel cell system is higher than the motor voltage and is also higher than the maximum output voltage of said secondary battery, restricts the output voltage of said fuel cell from being boosted by said first boost device and thus supplies the output voltage of said fuel cell directly to said drive motor.

11. The fuel cell system according to claim 8, wherein said boost control means device, when the drive state of said drive motor belongs to the predetermined drive range excluding the second predetermined drive range, restricts the output voltage of said fuel cell from being boosted by said first boost device and thus temporarily increases a capacity of the power supply to said drive motor from said secondary battery more than when performing the normal power supply.

12. The fuel cell system according to claim 8, wherein said boost control device, when the input-side voltage of said first boost device in said fuel cell system is equal to or lower than the maximum output voltage of said secondary battery and when an output-side voltage of said first boost device in said fuel cell system is equal to or lower than the maximum output voltage of said secondary battery, restricts the output voltage of said fuel cell from being boosted by said first boost device and thus temporarily increases the capacity of the power supply to said drive motor from said secondary battery more than when performing the normal power supply.

13. The fuel cell system according to claim 8, wherein the second predetermined drive range is coincident with the predetermined drive range.

14. The fuel cell system according to claim 8, wherein said second boost device can further step down the voltage output from said secondary battery and can supply the post-step-down voltage to said drive motor, and
said boost control device, if the drive state of said drive motor belongs to the predetermined drive range irrespective of whether the drive state belongs to the second predetermined drive range or not, restricts the output voltage of said fuel cell from being boosted by said first boost device and thus supplies the output voltage of said fuel cell directly to said drive motor.

15. A fuel cell system comprising:
a drive motor serving as a power source for driving a load and driven by electric power;
a fuel cell generating electricity with electrochemical reaction of an oxidation gas containing oxygen to a fuel gas containing hydrogen and supplying the electric power to said drive motor, an output voltage of said fuel cell being set so as to exceed a motor voltage necessary for driving said drive motor in a predetermined drive range defined as a partial area of all a drive range that can be taken by said drive motor, the predetermined drive range being the range in which a frequency of a user's request for driving the load is equal to or larger than a predetermined rate;
a first boost device boosting a voltage output from said fuel cell and enabling the post-boosting voltage to be supplied to said drive motor, the first boost device being able to control a terminal voltage of the fuel cell through the boost operation thereof; and
a boost control unit intermittently controlling the voltage boost by said first boost device on the basis of a correlation between an output voltage of said fuel cell and the motor voltage necessary for driving said drive motor when driving said drive motor,
wherein said boost control unit, when an input-side voltage of said first boost device in said fuel cell system is higher than the motor voltage, restricts the output voltage of said fuel cell from being boosted by said first boost device and thus supplies the output voltage of said fuel cell directly to said drive motor.

* * * * *

UNITED STATES PATENT AND TRADEMARK OFFICE
CERTIFICATE OF CORRECTION

PATENT NO.       : 8,603,687 B2                                    Page 1 of 1
APPLICATION NO.  : 12/811064
DATED            : December 10, 2013
INVENTOR(S)      : Hamada et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 560 days.

Signed and Sealed this

Twenty-second Day of September, 2015

Michelle K. Lee
*Director of the United States Patent and Trademark Office*